US012797937B2

(12) United States Patent
Yakabe et al.

(10) Patent No.: US 12,797,937 B2
(45) Date of Patent: Nov. 17, 2026

(54) TUBE EXPANSION TOOL

(71) Applicant: MAKITA CORPORATION, Anjo (JP)

(72) Inventors: Koichi Yakabe, Anjo (JP); Hiroki Ikuta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 546 days.

(21) Appl. No.: 18/074,776

(22) Filed: Dec. 5, 2022

(65) Prior Publication Data

US 2023/0226588 A1 Jul. 20, 2023

(30) Foreign Application Priority Data

Jan. 18, 2022 (JP) ................................ 2022-005807
Jan. 18, 2022 (JP) ................................ 2022-005813
Sep. 5, 2022 (JP) ................................ 2022-140599

(51) Int. Cl.
*B21D 41/02* (2006.01)
*B29C 57/04* (2006.01)

(52) U.S. Cl.
CPC ............ *B21D 41/028* (2013.01); *B29C 57/04* (2013.01)

(58) Field of Classification Search
CPC ...... B21D 41/028; B21D 39/20; B29C 57/04; B29C 57/045; B29K 2023/0691
See application file for complete search history.

(56) References Cited

U.S. PATENT DOCUMENTS 8,517,715 B2 * 8/2013 Thorson ............... B29D 23/001 425/467
8,763,439 B2 * 7/2014 Thorson ............... B29D 23/001 72/392
9,975,289 B2 * 5/2018 Li ........................ B21D 41/028
10,000,007 B2 * 6/2018 Dickert ................... B29C 57/04
10,830,320 B2 11/2020 Matsuto et al.

(Continued)

FOREIGN PATENT DOCUMENTS

CN 212653901 U 3/2021
JP 3838690 B2 * 10/2006

(Continued)

OTHER PUBLICATIONS

English Translation for JP 3838690 (Year: 2006).*

(Continued)

*Primary Examiner* — Seyed Masoud Malekzadeh
(74) *Attorney, Agent, or Firm* — Oliff PLC

(57) ABSTRACT

A tube expansion tool that expands an end portion of a synthetic resin made fluid pipe includes an electric motor that is housed in a main body housing. A screw shaft is located in the main body housing and is movable in a front-rear direction. A female screw member is configured to move the screw shaft in the front-rear direction by engaging with and rotating around the screw shaft. A gear that engages the female screw member transmits a rotation output of the output shaft of the electric motor to the female screw member. A wedge extends forward from the screw shaft. A plurality of jaws are coupled to the main body housing so as to be openable/closable. When the wedge moves forward integrally with the screw shaft, the plurality of jaws are pushed by the wedge so as to be opened radially outward relative to each other.

21 Claims, 21 Drawing Sheets

(56) References Cited

U.S. PATENT DOCUMENTS

| | | | | |
|---|---|---|---|---|
| 10,946,576 | B2 * | 3/2021 | Dickert | B29C 57/04 |
| 11,628,553 | B2 | 4/2023 | Ito et al. | |
| 12,275,188 | B2 * | 4/2025 | Tsuboi | B22F 12/53 |
| 2011/0239425 | A1 * | 10/2011 | Thorson | B29D 23/001<br>29/243.518 |
| 2013/0140739 | A1 | 6/2013 | Lundequist et al. | |
| 2013/0341831 | A1 * | 12/2013 | Thorson | B21D 41/026<br>425/392 |
| 2015/0367556 | A1 * | 12/2015 | Ellice | B29C 57/04<br>425/392 |
| 2016/0332358 | A1 * | 11/2016 | Dickert | B29C 57/045 |
| 2016/0361864 | A1 * | 12/2016 | Dickert | B29C 57/04 |
| 2018/0029286 | A1 * | 2/2018 | Li | B21D 41/028 |
| 2018/0093410 | A1 * | 4/2018 | Dickert | B29C 57/045 |
| 2018/0281272 | A1 * | 10/2018 | Dickert | B29C 57/04 |
| 2018/0281273 | A1 * | 10/2018 | Dickert | B29C 57/045 |
| 2019/0134884 | A1 * | 5/2019 | Dickert | B29C 57/045 |
| 2020/0261958 | A1 * | 8/2020 | Davies | B21D 41/028 |
| 2020/0261959 | A1 * | 8/2020 | Wekwert | B29C 57/06 |
| 2021/0170666 | A1 * | 6/2021 | Dickert | B29C 57/045 |
| 2021/0178657 | A1 * | 6/2021 | Dickert | B29C 57/045 |
| 2023/0256498 | A1 | 8/2023 | Wekwert et al. | |
| 2025/0319510 | A1 * | 10/2025 | Kim | B21D 26/033 |

FOREIGN PATENT DOCUMENTS

| | | | |
|---|---|---|---|
| JP | 2017-135849 | A | 8/2017 |
| JP | 2019048314 | A | 3/2019 |
| JP | 2021-171857 | A | 11/2021 |

OTHER PUBLICATIONS

Jun. 10, 2025 Office Action issued in Japanese Patent Application No. 2022-005807.

Feb. 2, 2026 Office Action issued in Japanese Patent Application No. 2022-140599.

May 28, 2026 Office Action issued in Chinese Patent Application No. 202211406023.3.

* cited by examiner

TUBE EXPANSION TOOL

CROSS-REFERENCE

This application claims priority to Japanese patent application serial number 2022-005807, filed on Jan. 18, 2022, to Japanese patent application serial number 2022-005813, filed on Jan. 18, 2022, and to Japanese patent application serial number 2022-140599, filed on Sep. 5, 2022, the entire contents of all of which are incorporated herein by reference.

BACKGROUND

The present invention generally relates to a tube expansion tool that expands, for example, an end portion of a synthetic resin made fluid pipe in order for the fluid pipe to be coupled to a pipe fitting.

For example, a fluid pipe made of PEX (cross-linked polyethylene) may be coupled to a metal pipe fitting. For this purpose, a tube expansion tool has been used for expanding an inner diameter of an end portion of a PEX tubing. The end portion of the PEX tubing may be expanded by the tube expansion tool to allow the PEX tubing to be coupled to the fitting. The end portion of the PEX tubing may elastically and gradually recover around the fitting to form a tight connection. The PEX tubing may be firmly coupled to the fitting due to this elastic recovery.

A tube expansion tool that expands a PEX tubing may be driven by an electric motor. The tube expansion tool may include an approximately conical wedge (mandrel) that moves forward/rearward (advances/retreats) with regard to an end portion of the PEX tubing positioned at a front portion of the tool. The tube expansion tool may also include a plurality of jaws circumferentially arranged around the wedge. The plurality of jaws may be opened relative to each other radially outward of the wedge by being pushed by the wedge as the wedge moves forward. When the plurality of jaws are inserted into an opening of an end portion of the PEX tubing and then the jaws are opened radially outward, the end portion of the PEX tubing may be expanded.

A tool main body of the tube expansion tool may also include an electric motor and a planetary gear reduction mechanism that reduces an output of an electric motor. The tube expansion tool may also include an approximately tubular-shaped grip that extends downward from the tool main body. A user may hold the tube expansion tool by holding the grip. For example, the electric motor, which is relatively heavy in weight, may be arranged in front of the grip. Because of this configuration, the center of gravity of the tool main body may be positioned forward of the center of the tool. As a result, a user may find it difficult to hold the tool main body in a stable manner. Furthermore, the planetary gear reduction mechanism, a total diameter of which is relatively large and a length of which is relatively large in its axial direction, may be arranged between the grip and the electric motor in an up-down direction. Because of this configuration, a length of the tube expansion tool may be large in the up-down direction. As a result, the stability of holding the tube expansion tool may be furthermore decreased.

A contraction (e.g., elastic recovery) speed of the PEX tubing after it has been expanded may change due to an ambient temperature and/or a temperature of the PEX tubing. For example, when the ambient temperature is high, the PEX tubing may be more elastically contractible (e.g., it may more quickly shrink/recover). That is, a contraction speed may be high. Because of this property, it may be desired that an end portion of the PEX tubing be expanded larger. In contrast, when the ambient temperature is low, the PEX tubing may have increased plasticity. In short, a contraction speed may be slower. Because of this property, when an end portion of the PEX tubing is expanded more (e.g., to compensate for the increased recovery speeds), it may take more time than necessary to couple the PEX tubing to the fitting when the ambient temperature is low. Thus, in this case, it may be desired that an expansion amount of the jaws be small. An expansion amount of the jaws may be larger when an end position (forward end position) of the advancing wedge is shifted forward. In contrast, the expansion amount of the jaws may be smaller when the end position of the advancing wedge is shifted rearward.

SUMMARY

As described above, there may be room to improve a configuration of an tube expansion tool so that a user can hold it in a more stable manner. It may be required that a user can hold a tube expansion tool in a stable manner, thereby improving operability.

Furthermore, in order to shift an initial position and an end position of the wedge, it may be required to detect the initial position and/or the end position of the wedge. In addition to this requirement, it may be also required to control a driving of the electric motor according to the desired shift in position(s). However, a conventional tube expansion tool has not adopted a configuration in which the initial position and/or the end position of the wedge can be detected, let alone shifted. Accordingly, a tube expansion tool in which the initial position and/or the end position of the wedge can be shifted and detected may be required.

According to one feature of the present disclosure, a tube expansion tool that is configured to expand an end portion of a synthetic resin made fluid pipe comprises an electric motor that is housed in a main body housing. The tube expansion tool further comprises a screw shaft in the main body housing that is movable in a direction parallel to an output shaft of the electric motor or along an axis line of the output shaft of the electric motor in a front-rear direction. The tube expansion tool further comprises a female screw member that moves the screw shaft in the front-rear direction by engagement with the screw shaft and rotation around an axis of the screw shaft. The tube expansion tool further comprises a gear that engages the female screw and that transmits a rotation output of the output shaft of the electric motor. The tube expansion tool further comprises a wedge extending forward from the screw shaft. Furthermore, the tube expansion tool further comprises a plurality of jaws that are coupled to the main body housing so as to be opened/closed. When the wedge moves forward integrally with the screw shaft, the plurality of jaws are pushed by the wedge to be opened radially outward relative to each other.

As described above, the electric motor is arranged such that the output shaft extends parallel to the screw shaft. Because of this configuration, the electric motor is aligned with the screw shaft in the front-rear direction and is located near to the screw shaft. Alternately, the electric motor is arranged such that the output shaft extends so as to be coaxial with the screw shaft. Because of this configuration, the electric motor is arranged close to the screw shaft. Accordingly, the electric motor, which is heavy in weight, can be positioned close to a center of the main body housing, in which the screw shaft is located. As a result, a good weight balance of the tube expansion tool can be obtained and a user can hold the tube expansion tool in a stable manner. Accordingly, an operability of the tube expansion tool can be improved.

DETAILED DESCRIPTION

Figure 1:
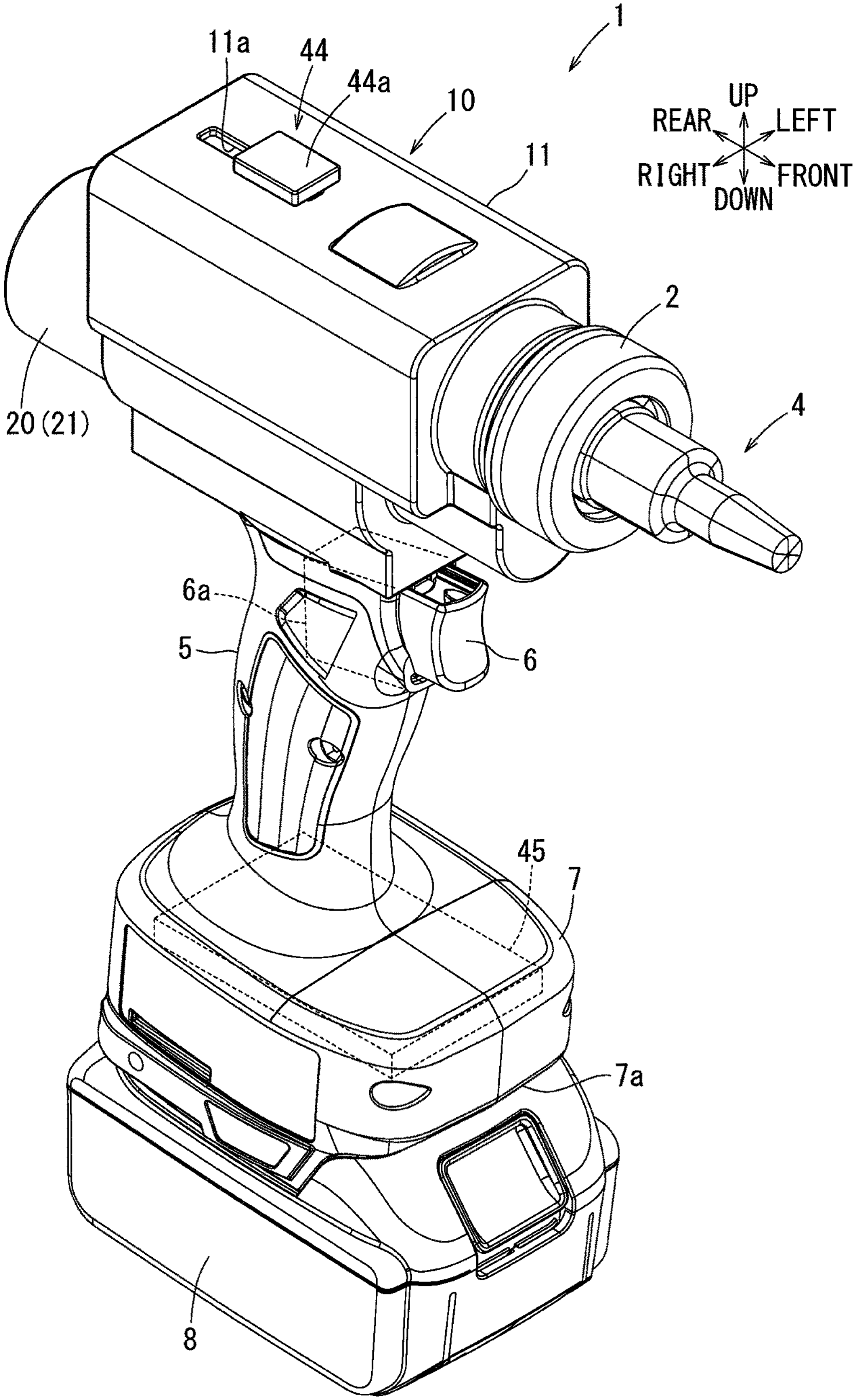
FIG. 1 is a perspective view of a tube expansion tool according to an exemplary embodiment of the present disclosure.

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, these specific details refer to well-known structures, components, and/or devices that are shown in block diagram form in order to avoid obscuring significant aspects of the exemplary embodiments presented herein.

According to a feature of the present disclosure, the tube expansion tool further comprises a grip extending downward from the main body housing. The grip is arranged between the electric motor and the plurality of jaws in the front-rear direction. Furthermore, the electric motor is arranged below the screw shaft. Accordingly, the electric motor and the plurality of jaws are arranged so as to have a good weight balance with respect to the grip. As a result, operability of the tube expansion tool can be improved when a user holds the grip.

According to another feature of the present disclosure, at least a part of the screw shaft overlaps the grip in the front-rear direction. Accordingly, a length of the tube expansion tool in the front-rear direction can be made short. Accordingly, a moment around a center of gravity of the tube expansion tool may be made small, which improves operability of the tube expansion tool.

According to another feature of the present disclosure, a planetary gear reduction mechanism that reduces a rotation output of the output shaft is arranged between the output shaft of the electric motor and the screw shaft. Accordingly, the planetary gear reduction mechanism is arranged in a compact manner in a rotation power transmission path from the electric motor to the screw shaft. Also, a transmission loss of the rotation power can be suppressed by minimizing the rotation power transmission path from the electric motor to the screw shaft.

According to another feature of the present disclosure, the tube expansion tool further comprises a rotation drive ring that is linked to a rear portion of the plurality of jaws. Furthermore, the tube expansion tool further comprises a jaw rotation mechanism that rotates the plurality of jaws in a circumferential direction by rotation of the rotation drive ring, which may be caused by the rotation output of the electric motor. Furthermore, the rotation drive ring is arranged in front of the female screw member. Accordingly, the female screw member, the rotation drive ring, and the plurality of jaws are arranged in this order in the front-rear direction, which is the direction in which the screw shaft extends. Because of this configuration, a center of gravity of the tube expansion tool may be positioned close to the screw shaft. As a result, the stability of holding the tube expansion tool can be improved.

According to another feature of the present disclosure, the tube expansion tool further comprises a cap that supports the plurality of jaws so as to allow the jaws to be opened/closed. The cap is also structured to restrict the plurality of jaws from moving in the front-rear direction. The tube expansion tool further comprises a front side mechanism housing, a first center mechanism housing, and a rear side mechanism housing arranged in this order from a front side to a rear side. These components are positioned within the main body housing. Furthermore, the tube expansion tool further comprises a bolt that connects the front side mechanism housing to the rear side mechanism housing. Furthermore, the front side mechanism housing is made of iron and supports the cap. The rear side mechanism housing is made of iron and supports an end portion of the female screw member.

Furthermore, the first center mechanism housing is made of a material that is lighter in weight than iron.

Because of this configuration, the tube expansion tool has a structure configured by the front side mechanism housing, the first center mechanism housing, and the rear side mechanism housing in a divided manner in the front-rear direction. When the plurality of jaws are opened, the cap and the front side mechanism housing that supports the cap may be strongly pushed forward by the plurality of jaws. The female screw member may be strongly pushed rearward by a reaction force caused by the screw shaft moving forward. Different from the above configuration, for example, in a case where the front side mechanism housing, the first center mechanism housing, and the rear side mechanism housing are combined to form an integral mechanism housing as a single component, when the plurality of jaws is opened, strong pulling forces may be generated at an front end and a rear end of the integral mechanism housing. Because of this, an entirety of the integral mechanism housing may be required to have high strength. However, in the present disclosure, the front mechanism housing, the first center mechanism housing, and the rear mechanism housing are arranged in the front-rear direction in a divided manner. Also, of these components, only the front side mechanism housing and the rear side mechanism housing are made of iron. Because of this configuration, the front side mechanism housing and the rear side mechanism housing, each of which has high strength, can both receive the pulling force in the front-rear direction. Also, the tube expansion tool may be made lighter in weight by the first center mechanism housing being made of a lighter material.

According to another feature of the present disclosure, the tube expansion tool further comprises a second center mechanism housing positioned between the first center mechanism housing and the rear side mechanism housing. Furthermore, each of the front side mechanism housing, the first center mechanism housing, the second center mechanism housing, and the rear side mechanism housing includes an engagement portion at each end portion thereof, such that adjacent engagement portions are configured to overlap each other in the front-rear direction. Accordingly, the front side mechanism housing and the first center mechanism housing can be precisely positioned relative to each other by overlapping the corresponding engagement portions. Also, the first center mechanism housing and the second center mechanism housing can be precisely positioned relative to each other by overlapping the corresponding engagement portions. Furthermore, the second center mechanism housing and the rear side mechanism housing can be precisely positioned relative to each other by overlapping the corresponding engagement portions. Because of this configuration, assemblability of each mechanism housing can be improved. Also, rattling of the components housed in the main body housing, such as, for example, the female screw member, can be prevented.

According to another feature of the present disclosure, a spindle that rotates integrally with the gear is arranged in front of the output shaft of the electric motor. Furthermore, the first center mechanism housing and the second center mechanism housing may each support a spindle bearing that rotatably supports the spindle and may also each support a female screw member bearing that rotatably supports the female screw member. Accordingly, the spindle bearings and the female screw member bearings may not substantially receive a direct force in the front-rear direction. Because of this configuration, the spindle and the female screw member can be supported by the first center mechanism housing and the second center mechanism housing, both of which have a weaker strength compared with the front side mechanism housing and the rear side mechanism housing. As a result, the tube expansion tool can be made more light weight, for instance due to having fewer components made of iron.

According to another feature of the present disclosure, the rear side mechanism housing supports a thrust bearing that contacts a rear end of the female screw member. When the screw shaft moves forward, the female screw member may be pushed rearward by a strong force. The rear side mechanism housing may receive the force by which the female screw member is pushed, via the thrust bearing. Because of this configuration, the female screw member can be precisely rotated around an axis of the screw shaft. As a result, the screw shaft can move precisely in the front-rear direction.

According to another feature of the present disclosure, a plurality of balls are placed between and engage with the screw shaft and the female screw member. Accordingly, the transmission efficiency of a driving force can be improved by the plurality of balls placed between the screw shaft and the female screw member. As a result, the rotation drive power of the female screw member can be efficiently converted to the movement of the screw shaft in the front-rear direction.

According to another feature of the present disclosure, the tube expansion tool further comprises a controller that switches between forward and reverse rotations of the output shaft of the electric motor. The tube expansion tool further comprises an initial position sensor and/or an end position sensor that detect(s) the screw shaft at an initial position and/or an end position, respectively, and transmit(s) a corresponding signal to the controller. Furthermore, the screw shaft moves forward and rearward between a rearward initial position and a forward end position by rotation of the female screw member. Furthermore, the initial position sensor, if present, is arranged so as to be movable in the front-rear direction such that an initial position of the screw shaft is movable by moving a position of the initial position sensor. The end position sensor, if present, is arranged so as to be movable in the front-rear direction such that an end position of the screw shaft is movable by moving a position of the end position sensor.

Because of this configuration, by displacing the end position sensor forward, an end position of the wedge moving forward can be set to a more forward position. Because of this, a pushing force of the wedge to enlarge the plurality of jaws radially outward can be larger at a newly positioned end position. Accordingly, an expansion width of the plurality of jaws opened radially outward relative to each other may be made larger. For example, in a case where a contraction speed of the fluid pipe is high, for example due to a high ambient temperature, an expansion width of the end portion of the fluid pipe can be made large. In contrast, by displacing the end position sensor rearward, an end position of the wedge moving forward can be set to a more rearward position. Because of this, a pushing force of the wedge to enlarge the plurality of jaws radially outward may be smaller at a newly positioned end position. Accordingly, an expansion width of the plurality of jaws 4 opened radially outward relative to each other can be made smaller. For example, in a case where a contraction speed of the fluid pipe is low, for instance due to a low ambient temperature, an expansion width of the end portion of the fluid pipe may be made smaller. In this manner, an expansion width of the jaws can be changed as desired, for instance in accordance with an ambient temperature or a temperature of the fluid pipe.

Furthermore, because of the above configuration, one may move the initial position sensor forward, thereby allowing an initial position of the wedge to be positioned in a more forward position. Accordingly, a time period from a time when the wedge starts to move from its initial position to a time when the wedge reaches the plurality of jaws can be reduced. As a result, a time taken to open/close the plurality of jaws per cycle can be reduced, which causes an overall operation time to be reduced. Furthermore, by moving the initial position sensor rearward, an initial position of the wedge may be positioned in a more rearward position. Accordingly, for example, when using a plurality of jaws having a thick thickness in a radial direction, an initial position of the wedge can be positioned in a more rearward position, such that the wedge does not interfere with the closing of the plurality of jaws.

According to another feature of the present disclosure, the initial position sensor and/or the end position sensor include(s) a Hall Effect element, which is positioned in the main body housing. Furthermore, the screw shaft includes a magnet. Accordingly, a structure for detecting the initial position sensor and/or the end position of the screw shaft can be made simple and compact. Accordingly, the main body housing, including the initial position sensor and/or the end position sensor, can be made compact.

According to another feature of the present disclosure, the initial position sensor and/or the end position sensor include(s) an operation part(s), extending outward of the main body housing. Accordingly, a user can move a position of the initial position sensor and/or a position of the end position sensor by shifting a position of the operation part(s). The user can move the position of the initial position sensor and/or the position of the end position sensor from outside of the main body housing using their finger. Because of this configuration, the initial position sensor and/or the end position sensor can be easily moved to a target position(s).

According to another feature of the present disclosure, the tube expansion tool further comprises a grip extending downward from the main body housing. Furthermore, the operation part(s) project(s) upward from an upper surface of the main body housing. Accordingly, the operation part(s) can be arranged on an upper side of the main body housing, such that the user can more easily view the operation part(s).

According to another feature of the present disclosure, the tube expansion tool further comprises a jaw rotation mechanism that rotates the plurality of jaws in a circumferential direction by a rotation output of the electric motor. Furthermore, the controller can supply a current to the electric motor based on a first upper limit value and a second upper limit value. The first upper limit value is defined as an upper limit of a current flowing to the electric motor in a rotation zone in which the plurality of jaws are rotated. Also, the second upper limit is defined as an upper limit of a current flowing to the electric motor in an expansion zone in which the plurality of jaws are opened radially outward relative to each other. That is, an upper limit of a current flowing to the electric motor can be changed based on whether the operation is in the rotation zone or the expansion zone. Because of configuration, for example, when the jaws become unrotatable, the electric motor can be prevented from continuing to be driven. As a result, an excessive force can be prevented from being applied to, for example, the jaws, the wedge, and the jaw rotation mechanism.

According to another feature of the present disclosure, the tube expansion tool further comprises a rotation number detection sensor that detects a number of rotations of the electric motor and transmits a corresponding signal to the controller. Furthermore, the controller defines the rotation zone and the expansion zone based on the corresponding signal from the rotation number detection sensor and detection of the signals relating to the initial position and the end position of the screw shaft. Because of this configuration, when an end position of the screw shaft is changed by moving a position of the end position sensor, the rotation zone and the expansion zone can be re-defined. As a result, a rotation operation and an expansion operation of the jaws can be controlled such that the fluid pipe can be expanded to a desired expansion width, for instance according to a contraction speed of the fluid pipe.

According to another feature of the present disclosure, the first upper limit value is set lower than the second upper limit value. Accordingly, an upper limit of a current flowing to the electric motor can be set low in the rotation zone, in which it is desired that a small load force is applied to the jaws and the jaw rotation mechanism. As a result, the electric motor can be prevented from being excessively driven in the rotation zone. Also, a load force applied to the jaws and the jaw rotation mechanism may be minimized.

According to another feature of the present disclosure, the rotation zone is a zone in which the wedge moves forward prior to entering the expansion zone. Accordingly, the plurality of jaws can expand radially outward relative to each other after having rotated in the circumferential direction of the wedge. By clear separation of the rotation operation and the expansion operation of the jaws, an unnecessary and accidental load force can be prevented from being applied to the jaws and the jaw rotation mechanism.

According to another feature of the present disclosure, the rotation zone is a zone in which the wedge moves rearward after having exited the expansion zone. Accordingly, the plurality of jaws can rotate in the circumferential direction of the wedge after the jaws are closed radially inward relative to each other. In this case, because the rotation operation and the expansion operation of the jaws are clearly separated, an accidental load force can be prevented from being applied to the jaws and the jaw rotation mechanism.

According to another feature of the present disclosure, a plurality of balls are placed between the screw shaft and the female screw member. Accordingly, the transmission efficiency of a driving force may be improved by the plurality of balls placed between the screw shaft and the female screw member. As a result, the rotation drive power of the female screw member can be efficiently converted to the movement of the screw shaft in the front-rear direction.

According to another feature of the present disclosure, a second plurality of jaws, each of which has a different thickness in the radial direction than the plurality of jaws, are configured to be attached to the tube expansion tool. Accordingly, fluid pipes having various different nominal diameters can be expanded using the same tube expansion tool.

According to another feature of the present disclosure, the tube expansion tool further comprises one or more sensor positioning mechanism by which the initial position sensor and/or the end position sensor is/are configured to be releasably positioned at a plurality of desired positions in the front-rear direction. Accordingly, the initial position sensor can be positioned such that an initial position of the wedge may be positioned at a desired position selected from predetermined positions. Also, the end position sensor may be positioned such that an end position of the wedge can be positioned at a desired position selected from predetermined positions. Accordingly, a user may not need to fine-adjust an initial position and/or an end position of the wedge, which improves usability of the tube expansion tool. Also, the initial position sensor and/or the end position sensor that is/are once positioned can be prevented from inadvertently being moved.

Next, one embodiment of the present disclosure will be described with reference to FIGS. 1 to 14. As shown in FIG. 1, a tube expansion tool 1 of the present disclosure may include a tool main body 10 that is housed in an approximately tubular-shaped main body housing 11. The tube expansion tool 1 may also include a grip 5 that extends downward from a middle portion of the tool main body 10 in a front-rear direction. In FIG. 1, a user who holds the tube expansion tool 1 may be situated on a rear side of the tube expansion tool 1. In the following explanation, the rear side of the tube expansion tool 1 may be also referred to as a user side, and a side opposite to the user side may be referred to as a front side. Also, a left/right side and an upper/lower side may be based on a user's position.

Figure 4:
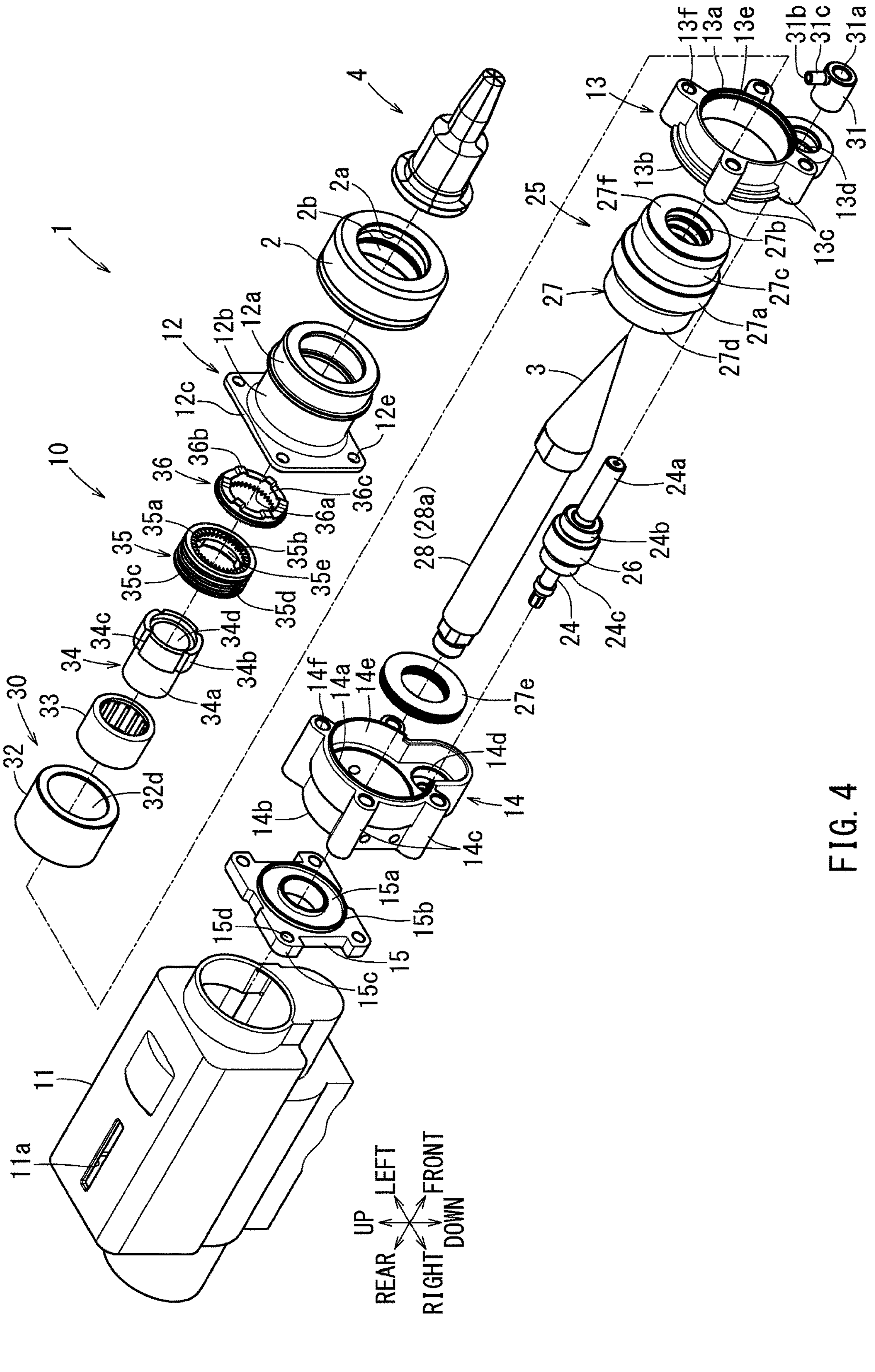
FIG. 4 is an exploded perspective view of the tool main body.

As shown in FIGS. 1 and 4, a ring-shaped cap 2 may be attached to a front portion of the main body housing 11 that is located forward of the grip 5. An approximately conical wedge 3 extending in a front-rear direction may be arranged inside of an inner circumferential surface of the cap 2. The wedge 3 may be attached to a front end of a cylindrical-shaped screw shaft 28. The screw shaft 28 may extend in the front-rear direction in a center of the main body housing 11. The wedge 3 may be movable in the front-rear direction integrally with the screw shaft 28. A plurality of jaws 4 may be arranged extending in the front-rear direction. The plurality of jaws 4 may be radially outward of the wedge 3 and radially inward of the cap 2. The plurality of jaws 4 may be arranged in a circumferential direction of the wedge 3 at equal intervals. For example, six jaws 4 may be arranged in the circumferential direction of the wedge 3 at an equal angular interval of 60 degrees. The plurality of jaws 4 may be opened/closed in a radial direction between a closed state and an open state. In the closed state, the plurality of jaws 4 may contact each other in the circumferential direction and cover the wedge 3. In the open state, the plurality of jaws 4 may be opened relative to each other radially outward and may expose a part of an end portion of the wedge 3.

As shown in FIG. 1, a trigger-type switch lever 6 may be disposed at a front surface of the grip 5. A user may pull the switch lever 6 while holding the grip 5. A switch main body 6*a*, which may turn on and off the tool 1 in conjunction with the pulling operation of the switch lever 6, may be disposed within the grip 5. The switch main body 6*a* may be in an off state when the switch lever 6 is not pulled, and may be in an on state when the switch lever 6 is pulled. An approximately rectangular box-shaped housing 7 that extends in the front-rear direction and in a left-right direction with respect to the grip 5 may be disposed at a lower end of the grip 5. The housing 7 may house a controller 45. The controller 45 may include a shallow rectangular box-shaped case and a resin-encapsulated control board housed in the case. The controller 45 may be housed in the housing 7 such that a width thereof (a shortest side of the case) extends in the up-down direction. The controller 45 may mainly control the driving of an electric motor 21, which will be discussed later in detail.

As shown in FIG. 1, a battery attachment portion 7*a* may be provided at a lower surface of the housing 7. A rectangular box-shaped battery 8 may be removably attached to the battery attachment portion 7*a*. The battery 8 may be removed from the battery attachment portion 7*a* by sliding the battery 8 in a forward direction with respect to the battery attachment portion 7*a*. In contrast, the battery 8 may be attached to the battery attachment portion 7*a* by sliding the battery 8 in a rearward direction from a front side of the battery attachment portion 7*a*. The battery 8 removed from the battery attachment portion 7*a* may be repeatedly recharged for use by a dedicated charger. The battery 8 may be used for other electric tools. The battery 8 may serve as a power source for the electric motor 21.

As shown in FIG. 4, the main body housing 11 may include a front side mechanism housing 12, a first center mechanism housing 13, a second center mechanism housing 14, and a rear side mechanism housing 15 in this order in the front-rear direction. The front side mechanism housing 12, the first center mechanism housing 13, and the second center mechanism housing 14 may be respectively formed to have substantially a cylindrical shape having an insertion hole at the center thereof that penetrates in the front-rear direction. The rear side mechanism housing 15 may be formed to have a plate shape having an insertion hole in the same manner as the other housings. A thickness direction of the rear side mechanism housing 15 may be aligned in the front-rear direction. The front side mechanism housing 12, the first center mechanism housing 13, the second center mechanism housing 14, and the rear side mechanism housing 15 may cooperate to form a mechanism housing that houses a spindle 24 and a female screw member 27, both of which will be discussed later in detail. The front side mechanism housing 12 and the rear side mechanism housing 15 may be made of iron or other suitably strong material. The first center mechanism housing 13 and the second center mechanism housing 14 may be made of aluminum or other suitably light material. In other words, the first center mechanism housing 13 and the second center mechanism housing 14 may be made of a material having a density less than that of iron.

Figure 2:
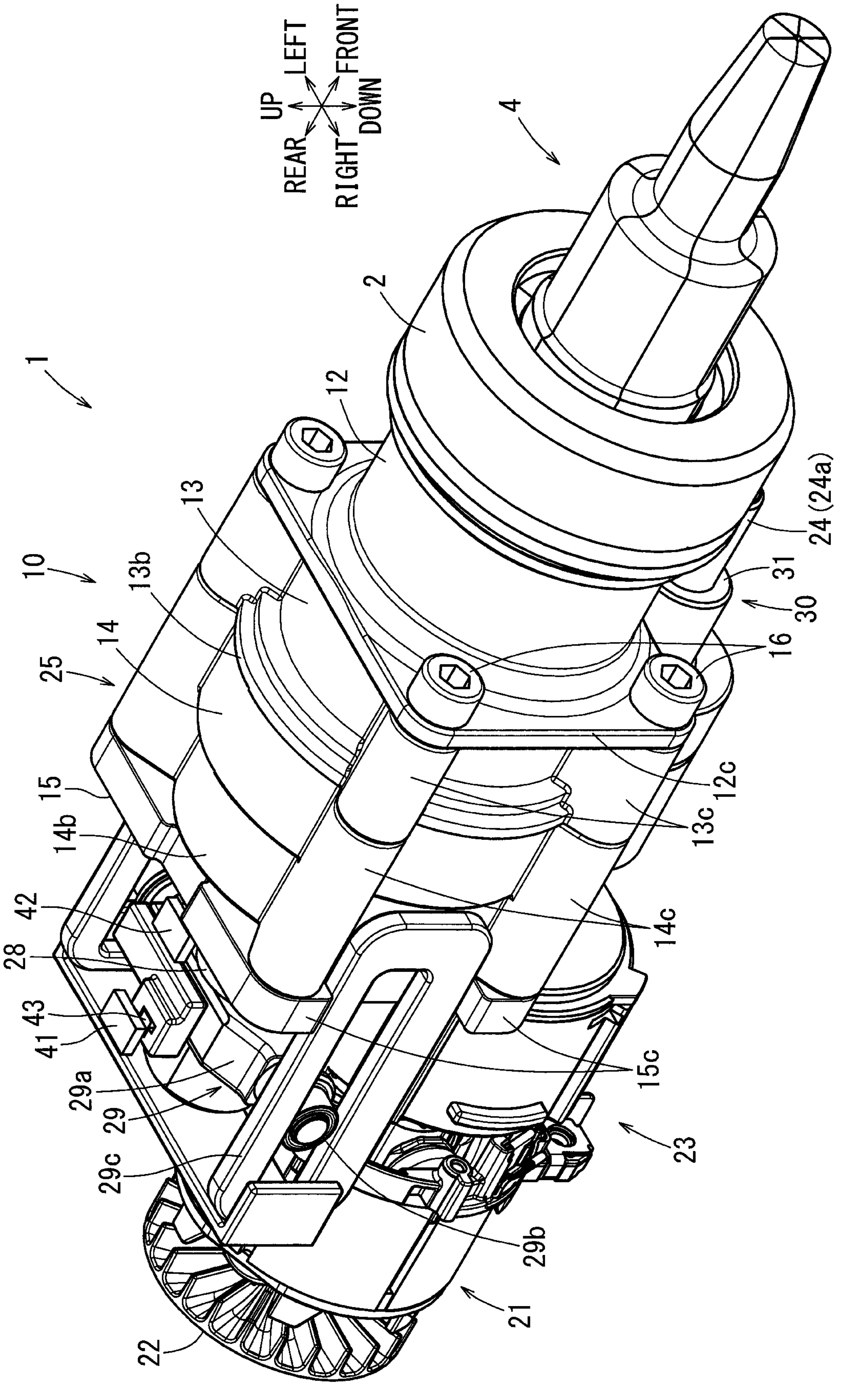
FIG. 2 is a perspective view of a tool main body of the tube expansion tool, from which a main body housing has been removed.

As shown in FIGS. 2 and 4, a male screw 12*a* may be formed on a front outer circumferential surface of the front side mechanism housing 12. A female screw 2*b* that engages the male screw 12*a* may be formed on an inner circumferential surface of the cap 2. By engaging the male screw 12*a* with the female screw 2*b*, the cap 2 may be coupled to a front portion of the front side mechanism housing 12. A rectangular extension portion 12*c* that extends outward in a radial direction and has an approximately rectangular-shaped plate shape may be formed at a rear portion of the front side mechanism housing 12. A through hole 12*e* may penetrate the rectangular extension portion 12*c* in the front-rear direction at each of the four corners of the rectangular extension portion 12*c*.

As shown in FIGS. 2 and 4, the first center mechanism housing 13, the second center mechanism housing 14, and the rear side mechanism housing 15 may each include four boss portions 13*c*, 14*c*, 15*c*, each of which is positioned radially outward. Each of the boss portions 13*c*, 14*c*, 15*c* may be formed in an approximately tubular shape extending in the front-rear direction. The boss portions 13*c*, 14*c* of the first center mechanism housing 13 and the second center mechanism housing 14 may each include central through holes 13*f*, 14*f*, which penetrate in the front-rear direction. Each of the boss portions 15*c* of the rear side mechanism housing 15 may include a screw hole 15*d* that extends in the front-rear direction at the center thereof.

As shown in FIGS. 2 and 4, when the rectangular extension portion 12*c* and the boss portions 13*c*, 14*c*, 15*c* are aligned in the front-rear direction, the corresponding through holes 12*e*, 13*f*, 14*f* may communicate with the screw holes 15*d* in the front-rear direction. Four bolts 15*d* may be inserted through the through holes 12*e*, 13*f*, 14*f* in the front-rear direction from the front side and be screw-connected to the screw holes 15*d*. Because of this configuration, the front side mechanism housing 12 and the rear side mechanism housing 15 may be linked to one another by the bolts 16, and such that the first center mechanism housing 13 and the second center mechanism housing 14 are held between the front side mechanism housing 12 and the rear side mechanism housing 15 in the front-rear direction.

Figure 3:
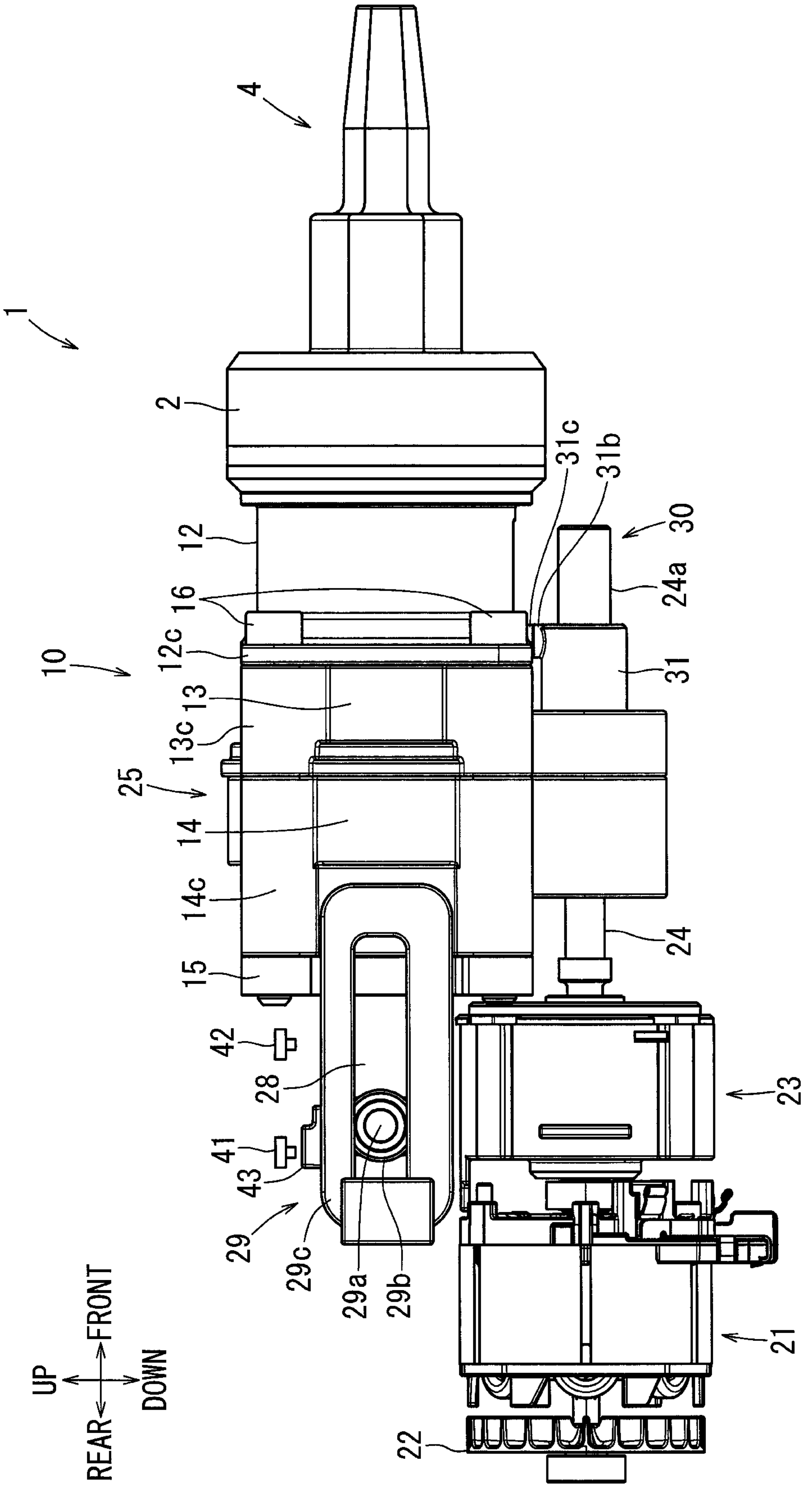
FIG. 3 is a right side view of the tool main body of the tube expansion tool, from which the main body housing has been removed.
Figure 5:
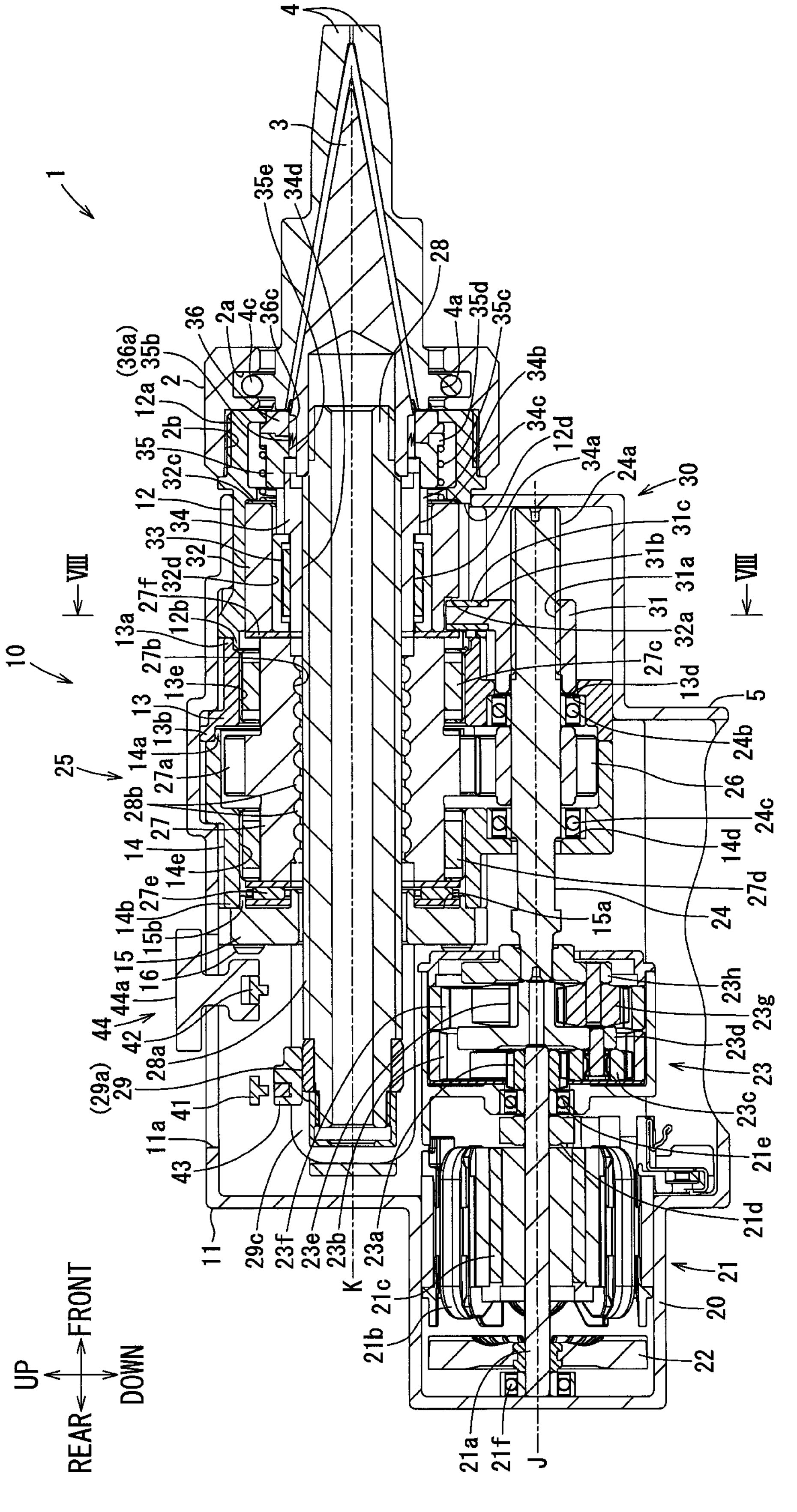
FIG. 5 is a lateral cross-sectional view of the tool main body, in which a wedge is located at an initial position.

As shown in FIGS. 3-5, a rear end of the front side mechanism housing 12 and a front end of the first center mechanism housing 13 may include an approximately cylindrical-shaped engagement portion 12*b* and engagement portion 13*a*, respectively. An outer circumferential surface of the engagement portion 12*b* of the front side mechanism housing 12 may have approximately the same diameter as an inner circumferential surface of the engagement portion 13*a* of the first center mechanism housing 13. The engagement portion 12*b* of the front side mechanism housing 12 may overlap the engagement portion 13*a* of the first center mechanism housing 13 in the front-rear direction, and the outer circumferential surface of the engagement portion 12*b* of the front side mechanism housing 12 may be tightly fitted with the inner circumferential surface of the engagement portion 13*a* of the first center mechanism housing 13 by a spigot-joint engagement.

As shown in FIGS. 3-5, a rear end of the first center mechanism housing 13 and a front end of the second center mechanism housing 14 may include an approximately cylindrical-shaped engagement portion 13*b* and engagement portion 14*a*, respectively. An inner circumferential surface of the engagement portion 13*b* of the first center mechanism housing 13 may have approximately the same diameter as an outer circumferential surface of the engagement portion 14*a* of the second center mechanism housing 14. The engagement portion 13*b* of the first center mechanism housing 13 may overlap the engagement portion 14*a* of the second center mechanism housing 14 in the front-rear direction, and the inner circumferential surface of the engagement portion 13*b* of the first center mechanism housing 13 may be tightly fitted with the outer circumferential surface of the engagement portion 14*a* of the second center mechanism housing 14 by a spigot-joint engagement.

As shown in FIGS. 3-5, a rear end of the second center mechanism housing 14 may include an approximately cylindrical-shaped engagement portion 14*b*. A front surface of the rear side mechanism housing 15 may include an approximately cylindrical-shaped engagement portion 15*b* projecting forward. An inner circumferential surface of the engagement portion 14*b* of the second center mechanism housing 14 may have approximately the same diameter as an outer circumferential surface of the engagement portion 15*b* of the rear side mechanism housing 15. The engagement portion 14*b* of the second center mechanism housing 14 may overlap the engagement portion 15*b* of the rear side mechanism housing 15 in the front-rear direction, and the inner circumferential surface of the engagement portion 14*b* of the second center mechanism housing 14 may be tightly fitted with the outer circumferential surface of the engagement portion 15*b* of the rear side mechanism housing 15 by a spigot-joint engagement.

As shown in FIGS. 1 and 5, an approximately tubular-shaped motor housing 20 that houses the electric motor 21 may be provided at a rear portion of the main body housing 11. The motor housing 11 may be positioned below the screw shaft 28 and on an upper rear side of the grip 5. The electric motor 21 may be, for example, a DC blushless motor. An output shaft 21*a* of the electric motor 21 may extend along a motor shaft axis line J in the front-rear direction, which is parallel to a direction in which the screw shaft 28 extends. The output shaft 21*a* may be supported by bearings 21*e*, 21*f* attached to the motor housing 20 so as to be rotatable around the motor shaft axis line J.

As shown in FIG. 5, a stator 21*b* of the electric motor 21 may be unrotatably supported on an inner circumferential surface of the motor housing 20. A rotor 21*c* of the electric motor 21 may be attached to the output shaft 21*a* so as to be integrally rotatable with the output shaft 21*a* and on an inner circumferential side of the stator 21*b*. A rotation number detection sensor 21*d* may be disposed in front of the rotor 21*c*. The rotation number detection sensor 21*d* may be used to detect the number of rotations of the output shaft 21*a* by detecting a rotation angle of the rotor 21*c*. (The controller 45 may determine the number of rotations based on the number of times the rotor 21*c* rotates at a certain angular position.) A fan 22 for introducing cooling air within the motor housing 20 may be attached to the output shaft 21*a* between the rotor 21*c* and the rear bearing 21*f* in the front-rear direction. When the fan 22 rotates integrally with the output shaft 21*a*, cooling air may flow from the front side toward the rear side of the housing 20.

As shown in FIG. 5, a planetary gear reduction mechanism 23 for reducing an output speed of the output shaft 21*a* may be positioned in front of the electric motor 21. The planetary gear reduction mechanism 23 may have an approximately tubular shape and be disposed around the motor shaft axis line J. The planetary gear reduction mechanism 23 may have approximately the same diameter as the electric motor 21. A first sun gear 23*a* may be arranged integrally with a front end of the output shaft 21*a*. The first sun gear 23*a* may be positioned at a rear end of the planetary gear reduction mechanism 23. A first internal gear 23*b* may be arranged radially outside of the first sun gear 23*a*. The first internal gear 23*b* may be ring-shaped around the motor shaft axis line J. A plurality of first planetary gears 23*c* may be engageably arranged between the first sun gear 23*a* and the first internal gear 23*b*. The first planetary gears 23*c* may engage a first carrier 23*d* in front of the first sun gear 23*a*. A rotation power of the output shaft 21*a* may be reduced and transferred to the first carrier 23*d* via the first sun gear 23*a* and the first planetary gears 23*c*.

As shown in FIG. 5, the first carrier 23*d* may be formed integrally with a second sun gear 23*e* and also may be rotatable integrally with the second sun gear 23*d* around the motor shaft axis line J. A second internal gear 23*f* may be arranged radially outside of the second sun gear 23*e*. The second internal gear 23*f* may be ring-shaped around the motor shaft axis line J. A plurality of second planetary gears 23*g* may be engageably arranged between the second sun gear 23*e* and the second internal gear 23*f*. The second planetary gears 23*g* may engage a second carrier 23*h* in front of the second sun gear 23*e*. The second carrier 23*h* may be formed integrally with the spindle 24 and may be rotatable around the motor shaft axis line J. Because of this configuration, a rotation power of the first carrier 23*d* may be reduced and transferred to the spindle 24 via the second sun gear 23*e*, the second planetary gears 23*g*, and the second carrier 23*h*. As a result, a rotation power of the output shaft 21*a* may be reduced and transferred to the spindle 24 via the planetary gear reduction mechanism 23.

As shown in FIG. 5, the spindle 24 may be supported by spindle bearings 24*b*, 24*c* so as to be rotatable around the motor shaft axis line J. The front spindle bearing 24*b* may be press-fit to a recessed portion 13*d* formed at a lower portion of the first center mechanism housing 13. The rear spindle bearing 24*c* may be press-fit to a recessed portion 14*d* formed at a lower portion of the second center mechanism housing 14. The spindle bearings 24*b*, 24*c* may be housed in a space formed by the first center mechanism housing 13 cooperating with the second center mechanism housing 14. The spindle 24 may include a gear 26 that is formed integrally with the spindle 24. The gear 26 may be configured to transmit a rotation power to the screw shaft 28. The gear 26 may be arranged between the spindle bearings 24*b*, 24*c*. A male screw (thread) 24*a* may be formed on an outer circumferential surface of the spindle 24 in front of the front side spindle bearing 24.

As shown in FIGS. 4 and 5, the tool main body 10 may include a feed screw mechanism 25, which may be also referred to as a ball screw mechanism. The feed screw mechanism 25 may include the screw shaft 28, the female screw member 27, and the gear 26. The screw shaft 28 may be arranged along a screw shaft axis line K that extends in the front-rear direction and at a center of the main body housing 11. The screw shaft 28 may be movable in the front-rear direction along the screw shaft axis line K. The screw shaft 28 may be arranged such that at least a part of the screw shaft 28 overlaps a portion of the grip 5 in the front-rear direction within a movable range of the screw shaft 28 from a rear end position to a front end position. When the screw shaft 28 is disposed at the end position in the movable range, the screw shaft 28 may overlap the output shaft 21*a* in the front-rear direction. The female screw member 27 may be formed in an approximately cylindrical shape, and may engage the screw shaft 28 and the gear 26. A female screw 27*b* may be formed on an inner circumferential surface of the female screw member 27. The female screw 27*b* may engage a male screw 28*a* of the screw shaft 28 via a plurality of balls 28*b* between the male screw 28*a* and the female screw 27*b*. The female screw member 27 may include a gear 27*a* that protrudes radially outward and engages the gear 26. A rotation of the spindle 24 may be transmitted to the female screw member 27 due to the engagement of the gear 27*a* of the female screw member 27 with the gear 26 of the spindle 24.

As shown in FIGS. 4 and 5, the female screw member 27 may be rotatably supported around the screw shaft axis line K by female screw member bearings 27*c*, 27*d* in the front-rear direction. The female screw member bearing 27*c* on the front side of the gear 27*a* may be press-fitted to an inner circumferential surface 13*e* of the first center mechanism housing 13. The female screw member bearing 27*d* on the rear side of the gear 27*a* may be press-fitted to an inner circumferential surface 14*e* of the second center mechanism housing 14. The female screw member bearings 27*c*, 27*d* may be housed in a space formed by the first center mechanism housing 13 cooperating with the second center mechanism housing 14. A thrust bearing 27*e* for receiving a thrust load that pushes the female screw member 27 in a rearward direction may be arranged between a rear surface of the female screw member 27 and a front surface 15*a* of the rear side mechanism housing 15. A washer 27*f* may be arranged between a front surface of the female screw member 27 and a rear surface of the power conversion ring 32. The power conversion ring 32 will be discussed later in detail.

As shown in FIGS. 2 and 3, a screw shaft guide 29 may be provided at a rear portion of the screw shaft 28. The screw shaft guide 29 may guide a movement of the screw shaft 28 in the front-rear direction with respect to the main body housing 11. The screw shaft guide 29 may include a support member 29*a* that is coupled to the screw shaft 28 and that extends in a left-right direction. The screw shaft guide 29 may also include a roller 29*b* that is provided on both left and right ends of the support member 29*a*. A pair of rails 29*c* that are each formed in a loop shape and extend in the front-rear direction may be provided on both left and right sides of the main body housing 11. Each roller 29*b* may engage the corresponding rail 29*c* so as to move in the front-rear direction along the rail 29*c*. The screw shaft 28 may be moved in the front-rear direction while being guided by the rollers 29*b*.

As shown in FIGS. 4 and 5, the tool main body 10 may include a jaw rotation mechanism 30 that rotates the plurality of jaws 4. The jaw rotation mechanism 30 may include a linear movement member 31 and a power conversion ring 32. The linear movement member 31 may be formed in an approximately cylindrical shape having an axis line in the front-rear direction. The linear movement member 31 may include a female screw 31*a* and a cylindrical-shaped protrusion 31*b*. The female screw 31*a* may be formed on an inner circumferential surface of the linear movement member 31. The cylindrical-shaped protrusion 31*b* may extend in a direction perpendicular to the axis line of the linear movement member 31. A roller 31*b* may be provided on an outer circumferential surface of the protrusion 31*b*. The roller 31*b* may cover the protrusion 31*b* in the circumferential direction and be rotatable around an axis of the protrusion 31*b*. The female screw 31*a* of the linear movement member 31 may engage the male screw 24*a* of the spindle 24. A rotation restriction portion 12*d* that restricts a rotation of the linear movement member 31 may be formed at a lower portion of the front side mechanism housing 12. The rotation restriction portion 12*d* may be formed in a groove shape extending lineally in the front-rear direction and may be formed so as to penetrate the front side mechanism housing 12 in the radial direction.

Figure 9:
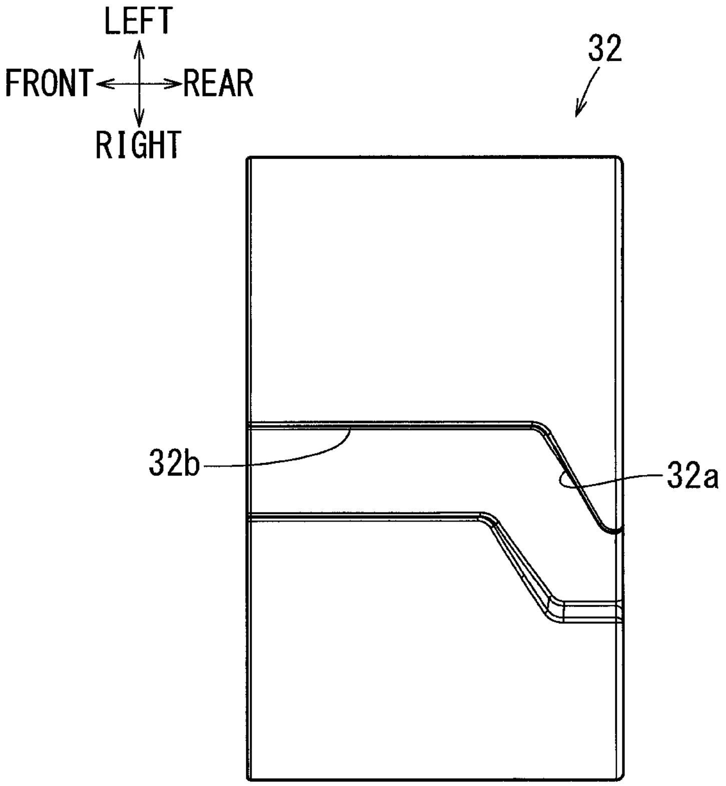
FIG. 9 is a bottom view of a power conversion ring.

As shown in FIGS. 4 and 9, the power conversion ring 32 may be formed in an approximately cylindrical shape. The power conversion ring 32 may have an insertion hole 32*d* that penetrates in the front-rear direction. Grooves 32*a*, 32*b* may be formed in a recessed shape on an outer circumferential surface of a lower portion of the power conversion ring 32. One groove 32*a* may extend in a circumferential direction of the power conversion ring 32. For example, the groove 32*a* may extend in a direction intersecting an axis of the power conversion ring 32 (e.g., the front-rear direction) at an inclined angle of 45 degrees. An inclined direction of the groove 32*a* may be a counterclockwise direction when viewed from a front side of the power conversion ring 32. The other groove 32*b* may extend in a direction parallel to the axis direction of the power conversion ring 32. The protrusion 31*b* to which the roller 31*c* is attached may be inserted into these grooves 32*a*, 32*b*. A front end of the first groove 32*a* may be connected to a rear end of the second groove 32*b*, such that the protrusion 31*b* can be moved smoothly between the first groove 32*a* and the second groove 32*b*.

As shown in FIGS. 5-8, the power conversion ring 32 may be housed in the front side mechanism housing 12. The linear movement member 31 may engage the male screw 24*a* of the spindle 24 at a position generally located below the front side mechanism housing 12. The protrusion 31*b* may extend upward so as to pass through the rotation restriction portion 12*d* and may be inserted into one of the grooves 32*a*, 32*b*. The roller 31*c* may contact both a wall surface of one of the grooves 32*a*, 32*b* and a wall surface of the rotation restriction portion 12*d*. The linear movement member 31 may be restricted from rotating around an axis of the spindle 24 due to the engagement of the protrusion 31*b* with the rotation restriction portion 12*d*.

Figure 10:
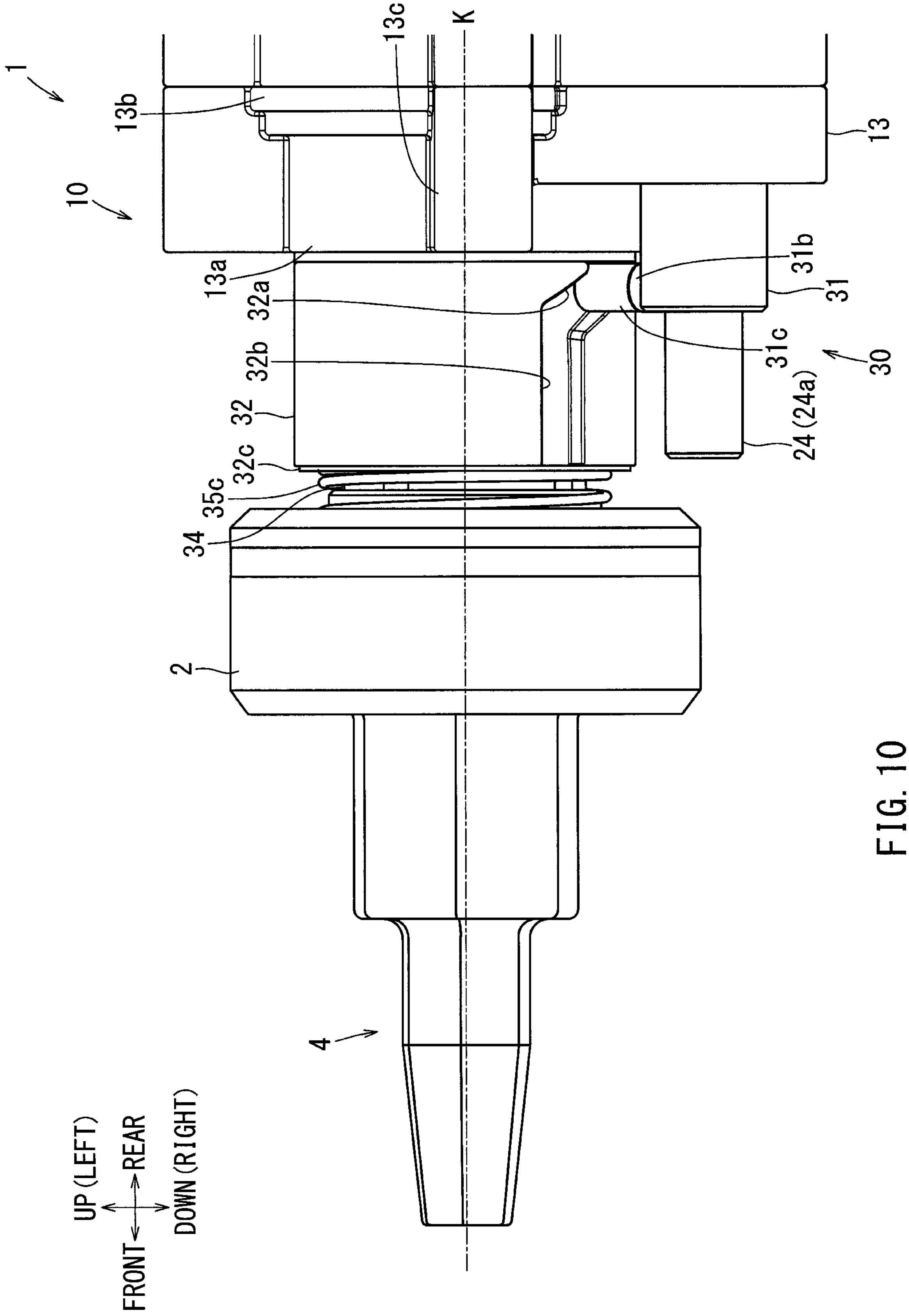
FIG. 10 is a jaw rotation mechanism viewed from a lower left, in which the wedge is located at the initial position.
Figure 11:
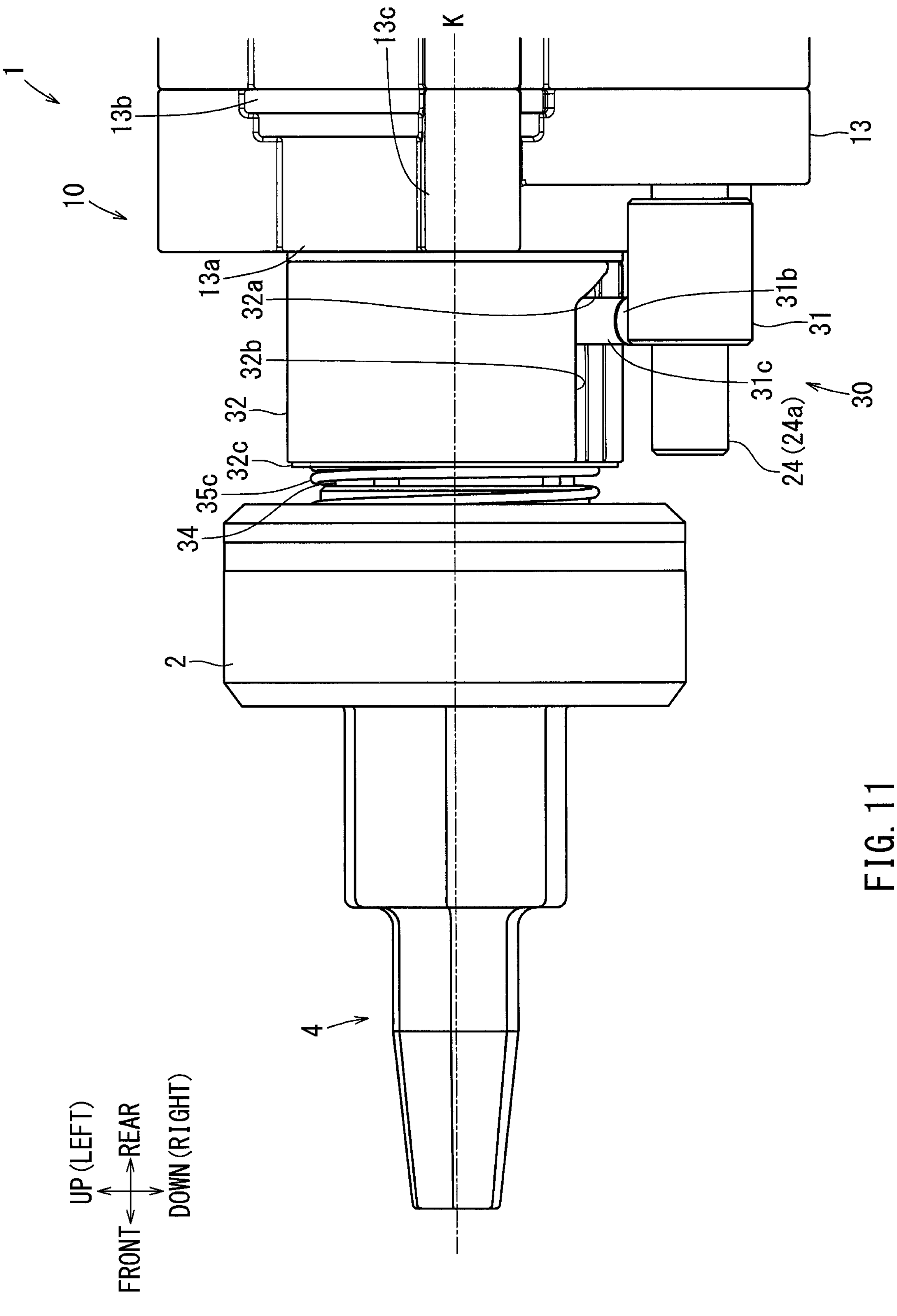
FIG. 11 is the jaw rotation mechanism viewed from the lower left, in which rotation of the jaw has been completed.
Figure 12:
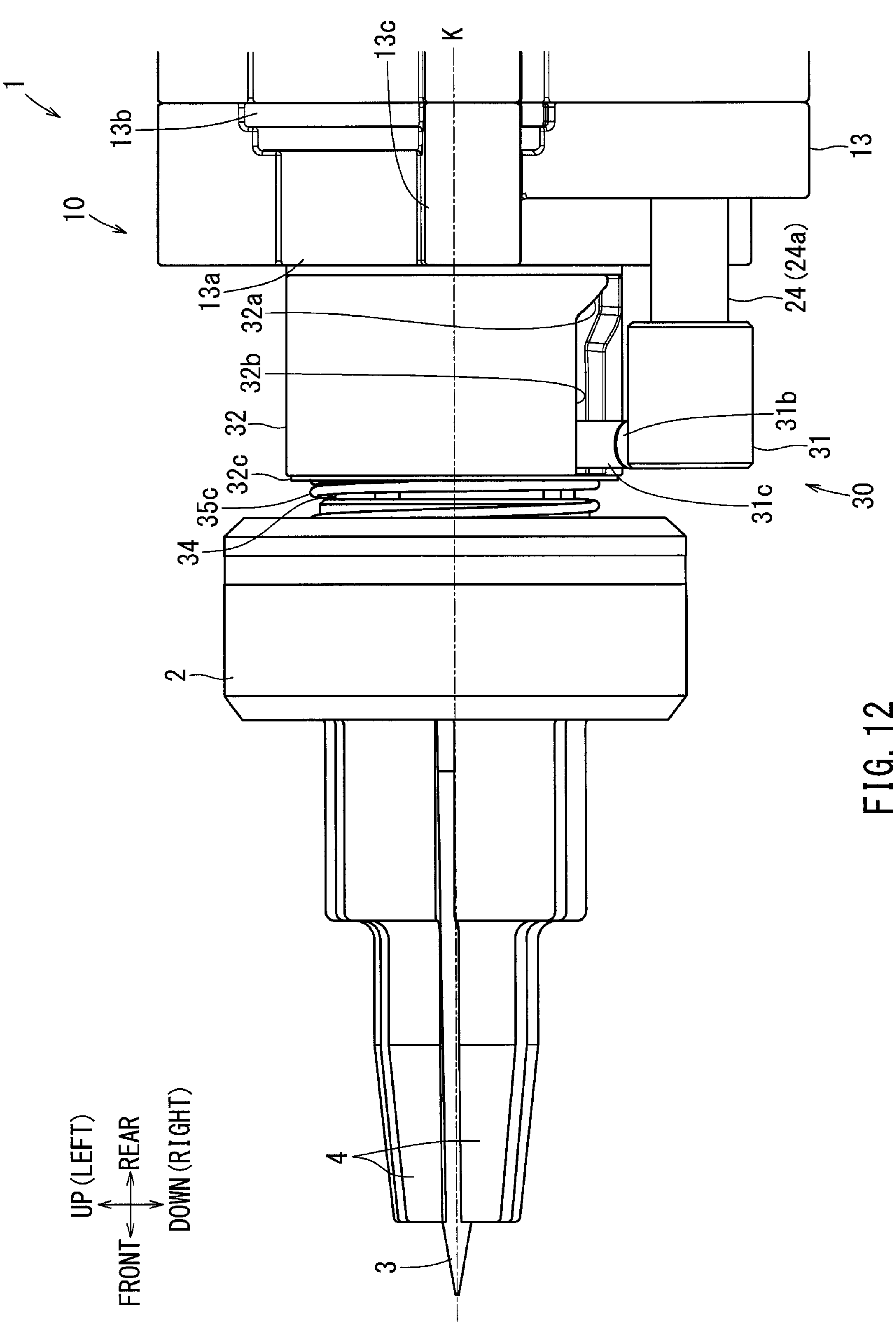
FIG. 12 is the jaw rotation mechanism viewed from the lower left, in which the wedge is located at the end position.
Figure 13:
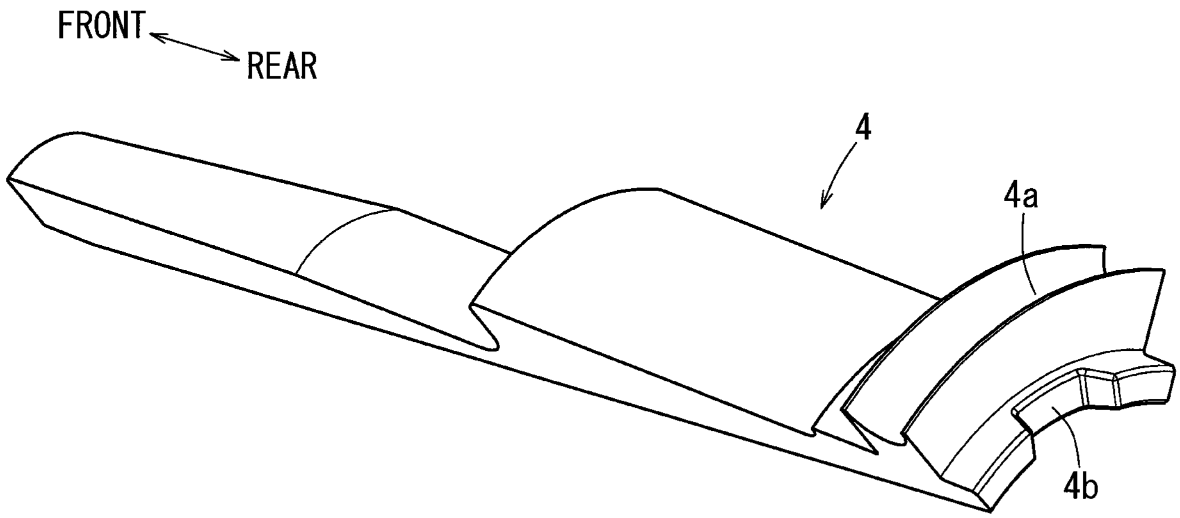
FIG. 13 is a perspective view of a jaw viewed from a rear side thereof.

As shown in FIGS. 10-12, when the spindle 24 rotates around its axis, the linear movement member 31 may move in the front-rear direction due to the engagement of the male screw 24*a* of the spindle 24 with the female screw 31*a* of the linear movement member 31 and due to the rotation restriction of the linear movement member 31 around the axis of the spindle 24. When the linear movement member 31 is disposed at the rear end of its movable range, the protrusion 31*b* may be disposed at a rear end of the groove 32*a*. As the linear movement member 31 moves forward from the rear end of its movable range, the protrusion 31*b* may move forward within the groove 32*a*. Because the linear movement member 31 is restricted from rotating, the protrusion 31*b* may not be significantly moved in the left-right direction. Because of this configuration, the protrusion 31*b* moving forward may push against the wall surface of the groove 32*a*. Accordingly, the power conversion ring 32 may rotate in a clockwise direction around the screw shaft axis line K when viewed from the front side of the power conversion ring 32. When the linear movement member 31 moves further forward, the protrusion 31*b* may enter the second groove 32*b* from the first groove 32*a*. Because the second groove 32*b* is not configured to be tilted in the front-rear direction, the protrusion 31*b* may not substantially push against the wall surface of the groove 32*b*. Because of this configuration, the power conversion ring 32 may not rotate at this time.

As shown in FIGS. 10-12, when the linear movement member 31 moves rearward from a front end of its movable range, the protrusion 31*b* may firstly move within the second groove 32*b*. In this case, because the protrusion 31*b* does not push against the wall surface of the groove 32*b*, the power conversion ring 32 may not rotate at this time. In contrast, when the protrusion 31*b* moves rearward within the first groove 32*a*, the protrusion 31*b* may push the wall of the first groove 32*a* to cause the power conversion ring 32 to rotate counterclockwise when viewed from the front side of the power conversion ring 32.

As shown in FIGS. 4 and 5, a cylindrical-shaped one way clutch 33 and an approximately cylindrical-shaped first rotation drive ring 34 may be arranged radially inward of the power conversion ring 32. The one way clutch 33 may be mounted on an inner circumferential surface of the power conversion ring 32. The first rotation drive ring 34 may be arranged radially inward of the one way clutch 33 and radially outward of the screw shaft 28. The one way clutch 33 may allow for rotation of the power conversion ring 32 only in a clockwise direction when viewed from the front. Accordingly, when rotating in this direction, rotation of the power conversion ring 32 may be transmitted to the first rotation drive ring 34. In contrast, a counterclockwise rotation of the power conversion ring 32 may not be transferred to the first rotation drive ring 34 through the one way clutch 33.

As shown in FIGS. 4 and 5, the first rotation drive ring 34 may have an approximately cylindrical shape. The first rotation drive ring 34 may have a through hole 34*d* passing through its center in the front-rear direction. The screw shaft 28 may be inserted into the insertion hole 34*d* so as to be moveable in the front-rear direction. The first rotation drive ring 34 may include a small diameter portion 34*a* and a large diameter portion 34*b*, both of which have a cylindrical shape around the screw shaft axis line K. The small diameter portion 34*a* may be arranged behind the large diameter portion 34*b*. The small diameter portion 34*a* may be press-fitted to an inner circumferential surface of the one way clutch 33. A plurality of recess grooves 34*c* extending in the front-rear direction may be formed on an outer circumferential surface of the large diameter portion 34*b*. The plurality of recess grooves 34*c* may be arranged at equal intervals in the circumferential direction. For example, the plurality of recess grooves 34*c* may be arranged at 90 degrees.

As shown in FIGS. 4 and 5, a second rotation drive ring 35 that engages the first rotation drive ring 34 may be arranged in front of the first rotation drive ring 34. The second rotation drive ring 35 may have an approximately cylindrical shape. The second rotation drive ring 35 may have a through hole 35*e* passing through its center in the front-rear direction. The screw shaft 28 and the first rotation drive ring 34 may be inserted into the through hole 35*e*. A plurality of engaging protrusions 35*a* extending radially inward may be provided on an inner circumferential surface of the second rotation drive ring 35. The plurality of engaging protrusions 35*a* may engage the plurality of recess grooves 34*c* when the first rotation drive ring 34 is inserted into the through hole 35*e*. Because of this configuration, the second rotation drive ring 35 may be rotatable around the screw shaft axis line K and may rotate integrally with the first rotation drive ring 34. Furthermore, the second rotation drive ring 35 may be configured to be slidable with respect to the first rotation drive ring 34 in the front-rear direction, which will be discussed later.

As shown in FIGS. 4 and 5, a spring receiving portion 35*d* extending radially outward may be formed at a front portion of the outer circumferential surface of the second rotation drive ring 35. A washer 32*c* may be arranged in front of the front surface of the power conversion ring 32. A compression spring 35*c* may be placed between the spring receiving portion 35*d* and the washer 32*c*. The second rotation drive ring 35 may be spring-biased in a forward direction by the compression spring 35*c*. A plurality of engagement teeth 35*b* in a shape of recesses and protrusions alternately arranged in a circumferential direction may be formed on a front surface of the second rotation drive ring 35.

As shown in FIGS. 4 and 5, a third rotation drive ring 36 may be arranged in front of the second rotation drive ring 35. The third rotation drive ring 36 may engage the second rotation drive ring and the plurality of jaws 4. The third rotation drive ring 36 may have an approximately cylindrical shape. The third rotation drive ring 36 may have a through hole 36*c* at its center passing through in the front-rear direction. The screw shaft 28 may be inserted into the through hole 36*c*. A plurality of engagement teeth 36*a* in a shape of recesses and protrusions alternately arranged in a circumferential direction may be formed on a rear surface of the third rotation drive ring 36. The engagement teeth 36*a* of the third rotation drive ring 36 may engage the engagement teeth 35*b* of the second rotation drive ring 35. The third rotation drive ring 36 may be rotatable around the screw shaft axis line K and may integrally rotate with the second rotation drive ring 35 due to the engagement teeth 35*b* of the second rotation drive ring 35 engaging with the engagement teeth 36*a* of the third rotation drive ring 36. A plurality of engagement protrusion 36*b* extending in the forward direction may be formed on a front end surface of the third rotation drive ring 36. Each of the plurality of engagement protrusion **36*b* may engage a corresponding engagement recess 4*b* that is formed on a rear end surface of the corresponding jaw 4 (refer to FIG. 13). Because of this configuration, the plurality of jaws 4 may be rotatable around the screw shaft axis line K and may rotate integrally with the third rotation drive ring 36**.

For example, there may be a situation where the jaws 4 are stuck to an inner circumferential surface of a fluid pipe. In this situation, the second rotation drive ring 35 may be moved rearward against the biasing force of the compression spring **35*c*. In other words, the second rotation drive ring 35 may be moved apart from the third rotation drive ring 36. Because of this configuration, the engagement teeth 35 of the second rotation drive ring 35 may disengage from the engagement teeth 36*a* of the third rotation drive ring 36. Furthermore, a rotation power transmission path for rotating the plurality of jaws 4 around the screw shaft axis line K may be shut off between the second rotation drive ring 35 and the third rotation drive ring 36. Accordingly, an excessive rotation power may be prevented from being applied to the jaws 4 when they are stuck to the fluid pipe. As a result, components that transmit rotation power, such as the linear movement member 31, the power conversion ring 32, and the first, second, and third rotation drive rings 34, 35, 36**, may be prevented from being damaged.

As shown in FIGS. 5-7 and 13, a ring holding groove **4*a*, which may have an arc-shaped cross section, may be formed on an outer circumferential surface of a rear portion of each jaw 4. Each of the ring holding groove 4*a* may be combined to form an annular groove in an integrally continuous manner. The plurality of jaws 4 may be combined in a circumferential direction by an elastically extendible ring 4*c* that is inserted into the ring holding grooves 4*a*. A jaw support groove 2*a* that extends radially outward and in the circumferential direction may be formed on an inner circumferential surface of the cap 2. The jaw support groove 2*a* may allow a radial movement of the ring 4*c* and may restrict a front-rear movement of the ring 4*c*. The plurality of jaws 4 may open/close in a radial direction around the ring 4*c* that is supported by the jaw support groove 2*a***.

Figure 6:
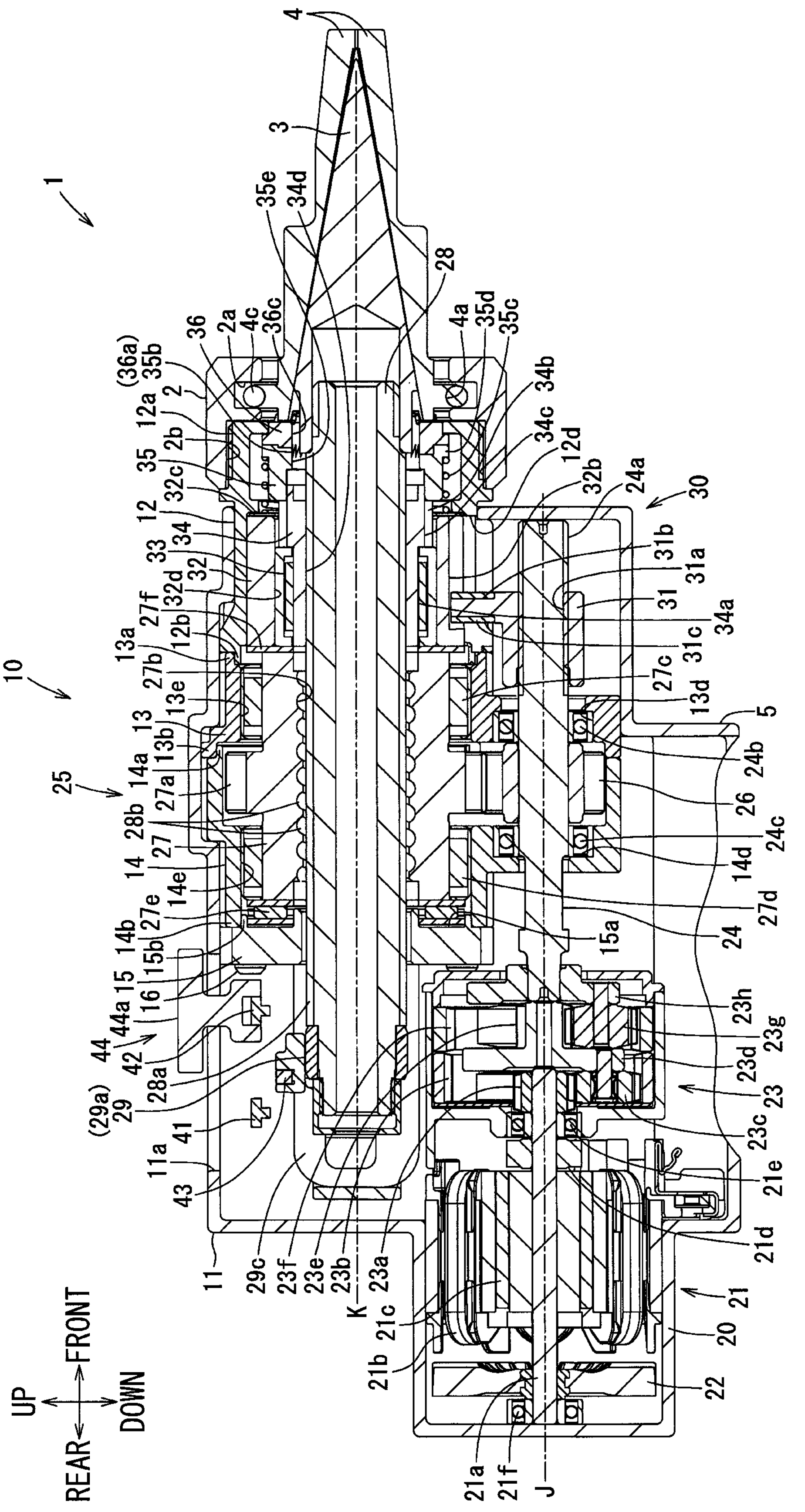
FIG. 6 is a lateral cross-sectional view of the tool main body, in which rotation of a jaw has been completed.
Figure 7:
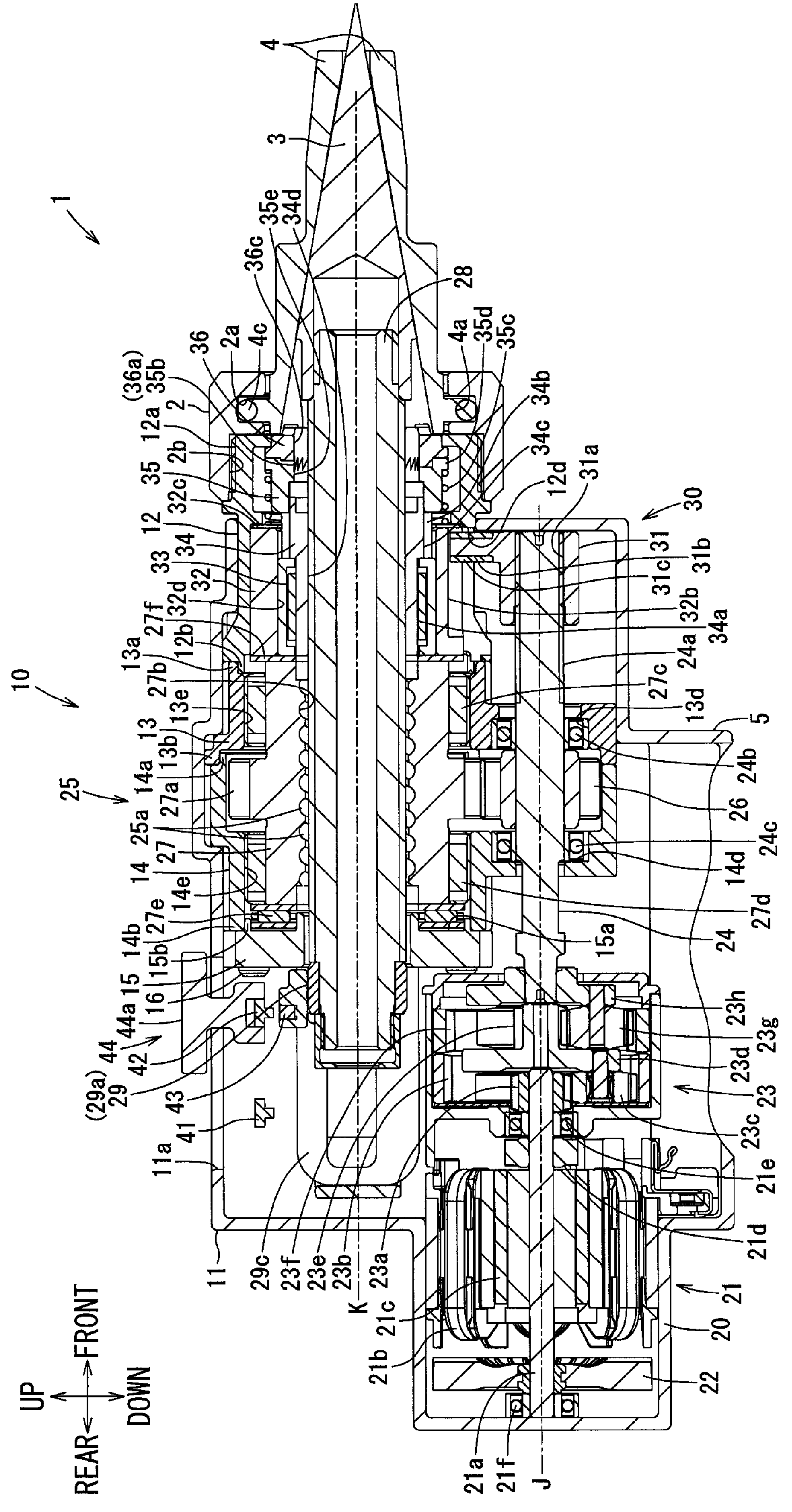
FIG. 7 is a lateral cross-sectional view of the tool main body, in which the wedge is located at an end position.
Figure 8:
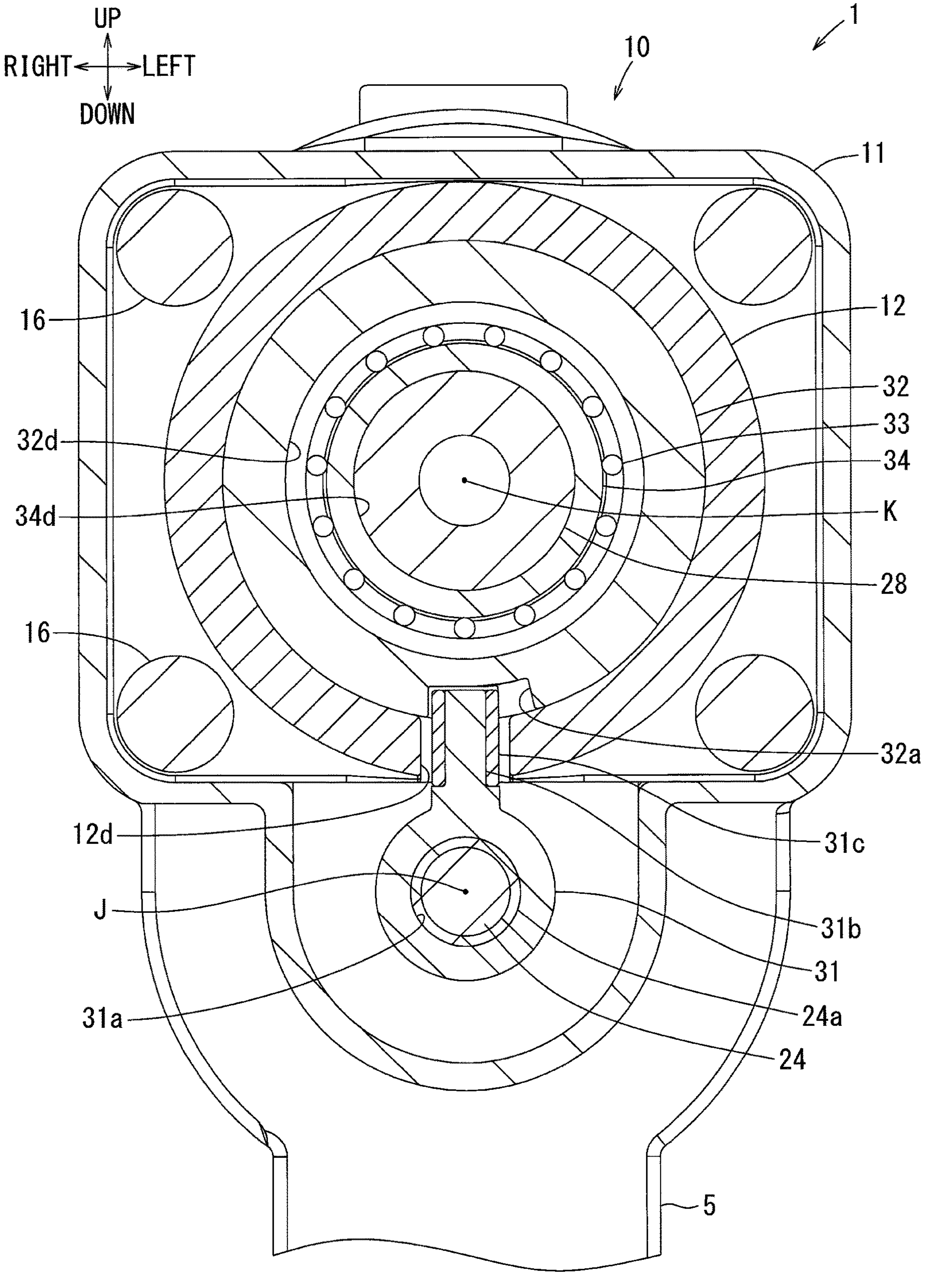
FIG. 8 is a cross-sectional view taken along line VIII-VIII of FIG. 5.

As shown in FIGS. 5-7, when the wedge 3 moves forward, the plurality of jaws 4 may open radially outward relative to each other and may push the cap 2 forward and radially outward. When the wedge 3 moves forward, the front side mechanism housing 12, which is integrally connected to the cap 2, may receive a strong and forward pulling force. When the screw shaft 28, which is integrally connected to the wedge 3, moves forward, the female screw member 27 may be pushed rearward due to a reaction force of the forward movement of the screw shaft 28. The rear side mechanism housing 15 may receive the reaction force via the thrust bearing **27*e*. Because of this configuration, when the wedge 3 and the screw shaft 28 move forward, strong pulling forces that are opposite to each other in the front-rear direction may be generated between the front side mechanism housing 12 and the rear side mechanism housing 15**.

As shown in FIGS. 5-7, the first center mechanism housing 13 and the second center mechanism housing 14, which may be separated from each other in the front-rear direction, may be placed between the front side mechanism housing 12 and the rear side mechanism housing 15. Because of this configuration, a forward force that the front side mechanism housing 12 receives may not be transmitted to the rear side mechanism housing 15. Also, a rearward force that the rear side mechanism housing 15 receives may not be transmitted to the front side mechanism housing 12. Furthermore, the front side mechanism housing 12 and the rear side mechanism housing 15 may be made of iron. Because of this configuration, the front side mechanism housing 12 and the rear side mechanism housing 15 may have rigidity against pulling forces opposite to each other in the front-rear direction.

As shown in FIGS. 5-7, the first center mechanism housing 13 may house and support the spindle bearing **24*b* and female screw member bearing 27*c*. The second center mechanism housing 14 may house and support the other spindle bearing 24*c* and the other female screw member bearing 27*d*. The spindle 24, which is rotatably supported by the spindle bearings 24*b*, 24*c*, may receive a reaction force generated by a front-rear movement of the linear movement member 31. However, this reaction force may be very small in comparison with a force that the female screw member 27 receives. Because of this, the spindle bearings 24*b*, 24*c* may not receive a substantial force in the front-rear direction. The thrust bearing 27*e* may receive a rearward force as it is pushed by the female screw member 27, which is rotatably supported by the female screw member bearings 27*c*, 27*d*. Because of this, the female screw member bearings 27*c*, 27*d* may not receive a substantial force in the front-rear direction. Furthermore, the first center mechanism housing 13 and the second center mechanism housing 14 may be separated in the front-rear direction with regard to the front side mechanism housing 12 and the rear side mechanism housing 15. Accordingly, when portions of the tube expansion tool 1 move in the front-rear direction, the first center mechanism housing 13 and the second center mechanism housing 14 may not substantially receive a force in the front-rear direction. As a result, the first center mechanism housing 13 and the second center mechanism housing 14** can be made of a lightweight material, such as die cast aluminum.

Referring to FIGS. 5-7, 10-12, an embodiment of the feed screw mechanism 25 and the jaw rotation mechanism 30 will be explained below. The output shaft **21*a* of the electric motor 21 may rotate. A rotation speed of the output shaft 21*a* may be reduced by the planetary gear reduction mechanism 23 and may then be transmitted to the spindle 24. When the spindle 24 rotates, the female screw member 27 may rotate due to the engagement between the gear 26 of the spindle 24 and the gear 27*a* of the female screw member 27. Furthermore, the linear movement member 31 may move in the front-rear direction due to the engagement between the male screw 24*a* of the spindle 27 and the female screw 31*a* of the linear movement member 31 and due to the rotation restriction of the linear movement member 31 by the rotation restriction portion 12*d*. When the female screw member 27 rotates, the screw shaft 28 may move in the front-rear direction due to the engagement between the female screw 27*b* of the spindle 27 and the male screw 28*a* of the screw shaft 28. When the screw shaft 28 moves forward, the wedge 3, which is mounted to the front end of the screw shaft 28, may push the plurality of jaws 4 and the ring 4*c* so as to move them radially outward toward an open position. In contrast, when the screw shaft 28 moves rearward, a pushing force of the wedge 3 may be eliminated to cause the ring 4*c* to shrink, thereby returning the plurality of jaws 4** to a closed position radially inward.

When the linear movement member 31 moves forward such that the protrusion **31*b* moves forward along and within the groove 32*a*, the power conversion ring 32 may rotate clockwise when viewed from the front side of the power conversion ring 32. A rotation of the power conversion ring 32 may be transmitted to the first rotation drive ring 34 via the one way clutch 33. The first rotation drive ring 34, the second rotation drive ring 35, and the third rotation drive ring 36 may rotate clockwise when viewed from the front side of the rings 34, 35, 36. Because of this configuration, the plurality of jaws 4, which are supported by the third rotation drive ring 36, may also rotate clockwise when viewed from the front side of the jaws 4. In contrast, when the protrusion 31***b* moves forward along within the second groove 32*b*, the power conversion ring 32 may not rotate. In this case, the first rotation drive ring 34, the second rotation drive ring 35, the third rotation drive ring 36, and the plurality of jaws 4 may not rotate at this time.

When the linear movement member 31 moves rearward such that the protrusion 31*b* moves rearward along and within the second groove 32*b*, the power conversion ring 32 may not rotate. Thus, the first rotation drive ring 34, the second rotation drive ring 35, the third rotation drive ring 36, and the plurality of jaws 4 may not rotate at this time. When the protrusion 31*b* moves rearward along and within the first groove 32*a*, the power conversion ring 32 may rotate counterclockwise when viewed from the front side of the power conversion ring 32. Viewed from the front side, the one way clutch 33 may be configured to transmit only its clockwise rotation to the first rotation drive ring 34. Because of this configuration, the first rotation drive ring 34, the second rotation drive ring 35, the third rotation drive ring 36, and the plurality of jaws 4 may not rotate at this time.

Forward and reverse rotations of the electric motor 21 can be controlled by the controller 45 (refer to FIG. 1). When the electric motor 21 rotates in a forward direction, the plurality of jaws 4 may open radially outward relative to each other by being pushed by the wedge 3 moving forward. Also, when the electric motor 21 rotates in the forward direction, the plurality of jaws 4 may rotate clockwise when viewed from the front side owing to the jaw rotation mechanism 30. When the electric motor 21 rotates in a reverse direction, the plurality of jaws 4 may close radially inward relative to each other according to the rearward movement of the wedge 3. Also, when the electric motor 21 rotates in the reverse direction, the plurality of jaws 4 may not rotate owing to a rotation restriction of the one way clutch 33.

A rotation timing of the plurality of jaws 4 owing to the jaw rotation mechanism 30 and an open/close timing of the plurality of jaws 4 owing to the front-rear movement of the wedge 3 caused by the feed screw mechanism 25 may be modified according to a design change of various mechanisms. For example, the operating timings can be changed by modifying the shapes of the groove 32*a*, 32*b* formed in the power conversion ring 32 or by modifying a movable range of the screw shaft 28 in the front-rear direction. In the disclosed embodiment, the plurality of jaws 4 may be configured to open/close just after a rotation of the plurality of jaws 4 has been completed.

As shown in FIGS. 3 and 5, an end position sensor 42 may be arranged above and on a rear side of the female screw member 27. The end position sensor 42 may detect that the screw shaft 28 has moved to an end position, which is located at a foremost end of its movable range. Furthermore, an initial position sensor 41 may be arranged behind the end position sensor 42. The initial position sensor 41 may detect that the screw shaft 28 has moved to an initial position, which is located at a rearmost end of its movable range. A sensor, such as, for example, a Hall Effect sensor, which detects a magnetic field, may be used for both the initial position sensor 41 and the end position sensor 42. The initial position sensor 41 may be fixed to the main body housing 11 above the screw shaft 28. The end position sensor 42 may be positioned above the screw shaft 28 and may be supported by the main body housing 11 so as to be movable in the front-rear direction.

As shown in FIGS. 1 and 5, a position adjustment mechanism 44 may be provided at an upper portion of the main body housing 11. The end position sensor 41 can be moved in the front-rear direction by using the position adjustment mechanism 44. A groove hole 11*a* may be formed on an upper surface of the main body housing 11. The groove hole 11*a* may pass through the main body housing 11 in an up-down direction and may extend linearly in the front-rear direction. The position adjustment mechanism 44 may include an operation part 44*a* that passes through the groove hole 11*a* and is exposed from the upper surface of the main body housing 11. The end position sensor 42 may be supported by a lower end of the operation part 44*a*, which may be inside of the main body housing 11. The end position sensor 42 may be integrally slidable with the operation part 44*a* when the operation part 44*a* slides along the groove hole 11*a* in the front-rear direction. A position of the end position sensor 42 in the front-rear direction can be changed when a user's finger slide operates the operation part 44*a*.

As shown in FIGS. 3 and 5, a magnet 43 may be attached to an upper rear side of the screw shaft 28. The initial position sensor 41 may be positioned such that when the screw shaft 28, and accordingly the wedge 3, is positioned at its initial position, the initial position sensor 41 overlaps the magnet 43 in the front-rear direction. The end position sensor 42 may be positioned such that when the screw shaft 28, and accordingly the wedge 3, is positioned at its end position, the end position sensor 42 overlaps the magnet 43 in the front-rear direction.

As described above, an tube expansion tool 1, which is configured to expand an end portion of a synthetic resin made fluid tube, may include an electric motor 21 that is housed in a main body housing 11, an embodiment of which is shown in FIGS. 5-7. The tube expansion tool 1 may include a screw shaft 28 housed in the main body housing 11, such that the screw shaft 28 is movable in a front-rear direction such that it moves approximately parallel to an output shaft 21*a* of the electric motor 21. In alternative embodiments, the screw shaft 28 may be movable along axis line of the output shaft 21*a* in the front-rear direction. The tube expansion tool 1 may include a female screw member 27 that moves the screw shaft 28 in the front-rear direction due to engagement with the screw shaft 28 and due to its rotation around an axis of the screw shaft 28. Furthermore, the tube expansion tool 1 may include a gear 26 that engages the female screw member 27 and that transmits a rotation power of the output shaft 21*a* of the electric motor 21 to the female screw member 27. The tube expansion tool 1 may include a wedge 3 that extends forward from the screw shaft 28. The tube expansion tool 1 may include a plurality of jaws 4 that are coupled to the main body housing 11 so as to be opened/closed when the wedge 3 moves integrally with the screw shaft 28. For instance, the plurality of jaws 4 may be pushed by the wedge 3 to be opened radially outward relative to each other when the wedge 3 moves forward.

As described above, the electric motor 21 may be arranged such that the output shaft 21 extends parallel to the screw shaft 28. Because of this configuration, the electric motor 21 may be arranged nearer to the screw shaft 28 in the front-rear direction and nearer to the screw shaft 28. Alternately, the electric motor 21 may be arranged such that the output shaft 21*a* extends coaxial to the screw shaft 28. Because of this alternate configuration, the electric motor 21 may be arranged closer to the screw shaft 28. Accordingly, the electric motor 21, which is typically heavy in weight, may be arranged to be closer to a center of the main body housing 11, in which the screw shaft 28 is located. As a result, a good weight balance of the tube expansion tool 1 may be obtained and a user can hold the tube expansion tool 1 in a stable manner. Accordingly, an operability of the tube expansion tool 1 can be improved.

As shown in FIG. 5, the tube expansion tool 1 may include the grip 5 extending downward from the main body housing 11. The majority of the grip 5 may be arranged between the electric motor 21 and the plurality of jaws 4 in the front-rear direction. The majority of the electric motor 21 may be arranged below the screw shaft 28. Accordingly, the electric motor 21 and the plurality of jaws 4 may be arranged so as to have a good weight balance with respect to the grip 5. As a result, operability of the tube expansion tool 1 can be improved when a user holds the grip 5.

As shown in FIG. 5, at least a part of the screw shaft 28 may overlap the grip 5 in the front-rear direction. Accordingly, a length of the tube expansion tool 1 in the front-rear direction can be made short. Thus, a moment around a center of gravity of the tube expansion tool 1 may be small, which improves operability of the tube expansion tool 1.

As shown in FIG. 5, a portion of a planetary gear reduction mechanism 23, which is configured to reduce a rotation output of the output shaft 21*a*, may be arranged between the output shaft 21*a* of the electric motor 21 and the screw shaft 28 (e.g., in the up-down direction). Accordingly, the planetary gear reduction mechanism 23 may be arranged in a compact manner. Additionally, a rotation power transmission path from the electric motor 21 to the screw shaft 28 may also be reduced. Also, a transmission loss of the rotation power may be suppressed by minimizing the rotation power transmission path from the electric motor 21 to the screw shaft 28.

As shown in FIGS. 4 and 5, the tube expansion tool 1 may include rotation drive rings 34, 35, 36 linked to a rear portion of the plurality of jaws 4. The tube expansion tool 1 may include a jaw rotation mechanism 30 that rotates the plurality of jaws 4 in the circumferential direction by rotation of the rotation drive rings 34, 35, 36, the rotation of which is caused by the rotation output of the electric motor 21. The rotation drive rings 34, 35, 36 may be arranged in front of the female screw member 27. Accordingly, the female screw member 27, the rotation drive rings 34, 35, 36, and the plurality of jaws 4 may be arranged in this order in the front-rear direction, which is a direction in which the screw shaft 28 extends. Because of this configuration, a center of gravity of the tube expansion tool 1 may be positioned closer to the screw shaft 28. As a result, the stability of holding the tube expansion tool 1 can be improved.

As shown in FIGS. 4 and 5, the tube expansion tool 1 may include a cap 2 that supports the plurality of jaws 4 when they are to be opened/closed. The cap 2 may also be configured such that it restricts the plurality of jaws 4 from moving in the font-rear direction. The tube expansion tool 1 may include a front side mechanism housing 12, a first center mechanism housing 13, and a rear side mechanism housing 15, which are arranged in this order from the front side to the rear side and are arranged within the main body housing 11. The tube expansion tool 1 may include bolts 16 that connect the front side mechanism housing 12 to the rear side mechanism housing 15. The front side mechanism housing 12 may be made of iron and support the cap 2. The rear side mechanism housing 15 may be made of iron and support an end portion of the female screw member 27. Also, the first center mechanism housing 13 may be made of a material that is lighter than iron in weight.

As described above, the tube expansion tool 1 may have a structure configured by the front side mechanism housing 12, the first center mechanism housing 13, and the rear side mechanism housing 15 being positioned in a divided manner in the front-rear direction. When the plurality of jaws 4 are opened, the cap 2 and the front side mechanism housing 12, which supports the cap 2, may be strongly pushed forward by the plurality of jaws 4. The female screw member 27 may be strongly pushed rearward by a reaction force caused by the screw shaft 28 moving forward. Different from the above configuration, for example in a case where the front side mechanism housing 12, the first center mechanism housing 13, and the rear side mechanism housing 15 are combined to form a single integral mechanism housing, when the plurality of jaws 4 is opened, strong pulling forces may be generated at a front end and a rear end of such an integral mechanism housing. Because of this, the entirety of the integral mechanism housing may be required to have high strength. However, in the present disclosure, the front mechanism housing 12, the first center mechanism housing 13, and the rear mechanism housing 15 may be arranged in the front-rear direction in a divided manner. Also, the front side mechanism housing 12 and the rear side mechanism housing 15 may be made of iron. Because of this configuration, the front side mechanism housing 12 and the rear side mechanism housing 15, each of which has high strength, can respectively receive the pulling force in the front-rear direction. Also, the tube expansion tool 1 may be made more light weight by making the first center mechanism housing 13 of a light material.

As shown in FIGS. 2 and 5, the tube expansion tool 1 may include a second center mechanism housing 14 between the first center mechanism housing 13 and the rear side mechanism housing 15. The front side mechanism housing 12 may include an engagement portion 12*b* at a rear end thereof, the first center mechanism housing 13 may include engagement portions 13*a*, 13*b* at a front and rear end thereof, the second center mechanism housing 14 may include engagement portions 14*a*, 14*b* at a front and rear end thereof, and the rear side mechanism housing 15 may include an engagement portion 15 at a front end thereof. Each of the engagement portions may be configured to overlap a corresponding adjacent engagement portion. Accordingly, the front side mechanism housing 12 and the first center mechanism housing 13 may be precisely positioned relative to each other by overlapping the engagement portion 12*b* of the front side mechanism housing 12 with the engagement portion 13*a* of the first center mechanism housing 13. Also, the first center mechanism housing 13 and the second center mechanism housing 14 may be precisely positioned relative to each other by overlapping the engagement portion 13*b* of the first center mechanism housing 13 with the engagement portion 14*a* of the second center mechanism housing 14. The second center mechanism housing 14 and the rear side mechanism housing 15 may be precisely positioned relative to each other by overlapping the engagement portion 14*b* of the second center mechanism housing 14 with the engagement portion 15*b* of the rear side mechanism housing 15. Because of this configuration, assemblability of each mechanism housing can be improved. Also, rattling of the components, such as, for example, the female screw member 27, which are housed in the main body housing 11, can be prevented.

As shown in FIG. 5, the spindle 24, which is configured to rotate integrally with the gear 26, may be arranged in front of the output shaft 21*a* of the electric motor 21. The first center mechanism housing 13 and the second center mechanism housing 14 may support the spindle bearings 24*b*, 24*c*, which rotatably support the spindle 24. Also, the first center mechanism housing 13 and the second center mechanism housing 14 may support the female screw member bearings 27*c*, 27*d*, which rotatably support the female screw member 27. Accordingly, the spindle bearings 24*b*, 24*c* and the female screw member bearings 27*c*, 27*d* may not substantially receive a force in the front-rear direction. Because of this configuration, the spindle 24 and the female screw member 27 can be supported by the first center mechanism housing 13 and the second center mechanism housing 14, both of which can have a weaker strength compared with the front side mechanism housing 12 and the rear side mechanism housing 15. As a result, the tube expansion tool 1 can be made more light weight, for instance by having fewer components made of iron.

As shown in FIG. 5, the rear side mechanism housing 15 may support a thrust bearing 27*e* that is configured to make contact with a rear end of the female screw member 27. When the screw shaft 28 moves forward, the female screw member 27 may be pushed rearward by a strong force. The rear side mechanism housing 15 may receive the force by which the female screw member 27 is pushed via the thrust bearing 27*e*. Because of this configuration, the female screw member 27 can be precisely rotated around an axis of the screw shaft 28. As a result, the screw shaft 28 may move more precisely in the front-rear direction.

As shown in FIG. 5, a plurality of balls 28*b* may be placed between and engage with the screw shaft 28 and the female screw member 27. Accordingly, a transmission efficiency of a driving force may be improved by the plurality of balls 28*b* placed between the screw shaft 28 and the female screw member 27. As a result, a rotation drive power of the female screw member 27 may be efficiently converted to movement of the screw shaft 28 in the front-rear direction.

When the end position sensor 43 is displaced forward, an end position of the wedge 3 may be positioned to a more forward position. As a result, a more rearward portion of an outer circumferential surface of an approximately conical wedge 3, which has a larger diameter, may push the plurality of jaws 4 radially outward. Therefore, the plurality of jaws 4 may be pushed to have a larger diameter at the newly positioned end position. A force that pushes the plurality of jaws 4 radially outward may be large because the conical wedge 3 has be inserted further through the plurality of jaws 4. Accordingly, an expansion width of the plurality of jaws 4 extending radially outward relative to each other may be made large. For example, in a case where a contraction speed of an expanded fluid pipe is high owing to a high ambient temperature or a high pipe temperature, an expansion width of an end portion of the fluid pipe may be made large by displacing the end position sensor 42 in a forward position.

In contrast, when the end position sensor 42 is displaced rearward, an end position of the wedge 3 may be positioned at a more rearward position. As a result, a more frontward portion of an outer circumferential surface of an approximately conical wedge 3 may push the plurality of jaws 4. Thus a portion of the wedge 3 with a relatively smaller diameter may push the plurality of jaws 4 when the wedge 3 is at the newly positioned end position. Accordingly, a force that pushes the plurality of jaws 4 radially outward may be small because the wedge 3 is inserted less into the plurality of jaws 4. Accordingly, an expansion width of the plurality of jaws 4 extending radially outward relative to each other may be made small. For example, in a case where a contraction speed of an expanded fluid pipe is low owing to a low ambient temperature or a low pipe temperature, an expansion width of an end portion of the fluid pipe may be made small by displacing the end position sensor 42 in a rearward position.

When the plurality of jaws 4 shown in FIGS. 5-7 are opened radially outward relative to each other, the plurality of jaws 4 may receive a large load force from the fluid pipe when expanding an end portion of the fluid pipe. On the other hand, when the plurality of jaws 4 are rotated within the fluid pipe in a circumferential direction, the plurality of jaws 4 may receive a small load force, compared to a case where the end portion of the fluid pipe is expanded radially outward. Because of this configuration, a required output power of the electric motor 21 when the plurality of jaws 4 are to be opened radially outward relative to each other may be larger than that when the plurality of jaws 4 are to be rotated. In some embodiments, it may be assumed that an upper limit value of a current flowing to the electric motor 21 is always constant. However, the plurality of jaws 4 sometimes may not be able to be rotated because the jaws 4 are stuck to an inner circumferential surface of the fluid pipe. In this case, an increasing current may be applied to the electric motor 21 until the current reaches the upper limit. Because of this possibility, there may be a risk that jaws 4 are damaged owing to an excessive force applied to un-rotatable jaws 4 or that the fluid pipe is damaged owing to the jaws 4 rotating with an excessive force while they are still binding with the fluid pipe.

In the present disclosure, in a rotation zone, which is a portion of the operation in which the jaws 4 are to be rotated, a first upper limit value of a current flowing to the electric motor 21 may be set in order to prevent an excessive force from being applied to the jaws 4. Also, in an expansion zone, which is a portion of the operation in which the jaws 4 are to be opened radially outward relative to each other, a second upper limit value of a current flowing to the electric motor 21 may be set. The first upper limit value may be set lower than the second upper limit value. For example, the first upper limit value may be set to less than 70%, less than 50%, or less than 30% of the second upper limit value. Because of this settings, when the jaws 4 become un-rotatable when operating in the rotation zone, driving of the electric motor 21 may be stopped at the first upper limit value, which is lower than the second upper limit value. As a result, an excessive force may be prevented from being applied to the un-rotatable jaws 4. The controller 45 (refer to FIG. 1) may detect when the operation is in the rotation zone and the expansion zone, based on a rotation number of the electric motor 21 and/or the position of the wedge 3 in the front-rear direction.

Figure 14:
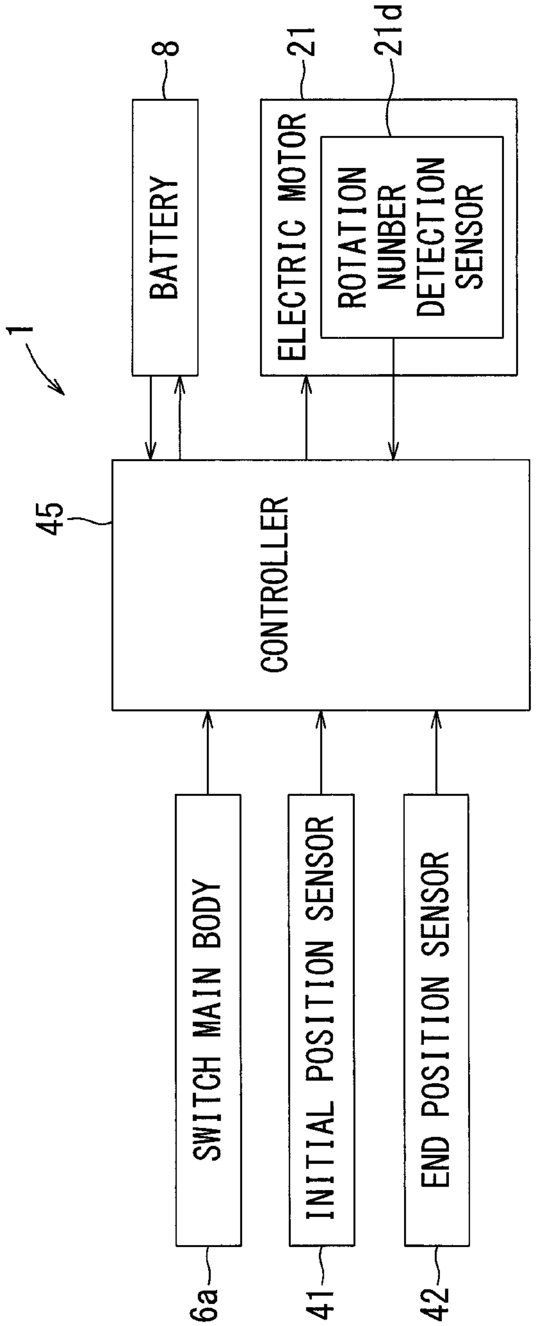
FIG. 14 is a block diagram of electrical components of the tube expansion tool.

Referring to FIG. 14, when the controller 45 receives an on signal from the switch main body 6*a*, the controller 45 may start the electric motor 21 by supplying power to the electric motor 21 from the battery 8. The controller 45 may detect a number of rotations of the electric motor 21 by receiving a phase detection signal of the rotor 21*c* from the rotation detection sensor 21*d* provided at the electric motor 21. The initial position sensor 41 may transmit a detection signal of the initial position of the screw shaft 28 to the controller 45 when it detects the magnet 43 (refer to FIG. 5). Similarly, the end position sensor 42 may transmit a detection signal of the end position of the screw shaft 28 to the controller 45 when it detects the magnet 43.

By the controller 45 shown in FIG. 14, a rotation zone may be set to be a time zone between a time when the controller 45 receives a detection signal of the initial position sensor 41 and a time when the controller 45 detects that the motor 21 has rotated a predetermined number of rotations. A predetermined rotation number of the electric motor 21 may be determined and stored for use by the controller 45. The predetermined rotation number of the electric motor 21 may be based on, for example, the shapes of the groove 32*a*, 32*b* of the power conversion ring 32 (refer to FIG. 9), a feeding amount of the screw shaft 28, the linear movement member 31 per one rotation of the spindle 24 (refer to FIGS. 5-7), etc. The controller 45 may control a forward/reverse rotation and a rotation speed of the electric motor 21. As a result, a movement direction and a movement speed of the wedge 3, as well as a rotation direction and a rotation speed of the jaws 4, may be changed.

As described above, a tube expansion tool 1 configured to expand an end portion of a synthetic resin made fluid tube may include a controller 45 (refer to FIG. 1) that switches between forward and reverse rotations of an output shaft 21*a* of an electric motor 21, as shown in FIG. 5. The tube expansion tool 1 may include a female screw member 27 that is rotated by the electric motor 21. The tube expansion tool 1 may include a screw shaft 28 that engages the female screw member 27 and that moves forward and rearward between a rearward initial position and a forward end position due to rotation of the female screw member 27. The tube expansion tool 1 may include a wedge 3 that extends forward from the screw shaft 28. The tube expansion tool 1 may include a plurality of jaws 4 that are opened radially outward by being pushed by the wedge 3 when the wedge 3 and the screw shaft 28 move forward. The tube expansion tool 1 may include an end position sensor 42 that detects the screw shaft 28 at the forward end position and that transmits a corresponding signal to the controller 45. The end position sensor 42 may be arranged so as to be movable in a front-rear direction. An end position of the screw shaft 28 may be adjustable by displacing a position of the end position sensor 42.

By displacing the end position sensor 42 forward, an end position of the forward moving wedge 3 may be set to a more forward position. Because of this, a pushing force of the wedge 3 to enlarge the plurality of jaws 4 radially outward may be larger because of the insertion depth of the wedge 3 at a newly positioned end position. Accordingly, an expansion width of the plurality of jaws 4 opened radially outward relative to each other may be made large. For example, in a case where a contraction speed of the fluid pipe is high at a high ambient temperature, an expansion width of the end portion of the fluid pipe may be made large. In contrast, by displacing the end position sensor 42 rearward, an end position of the wedge 3 moving forward may be set to a more rearward position. Because of this, a pushing force of the wedge 3 to enlarge the plurality of jaws 4 radially outward may be smaller because the wedge 3 is inserted less at a newly positioned end position. Accordingly, an expansion width of the plurality of jaws 4 opened radially outward relative to each other may be made small. For example, in a case where a contraction speed of the fluid pipe is low at a low ambient temperature, an expansion width of the end portion of the fluid pipe may be made small. In this manner, an expansion width of the jaws 4 may be changed according to an ambient temperature, a temperature of the fluid pipe, or other parameter.

As shown in FIGS. 3 and 5, the tube expansion tool 1 may include an initial position sensor 41 that detects whether the screw shaft 28 is at the initial position. By detecting the initial position and the end position of the screw shaft 28, a position of the screw shaft 28, as well as a position of the wedge 3, may be precisely detected in the front-rear direction.

As shown in FIG. 5, the end position sensor 42 may include a Hall Effect sensor provided in the main body housing 11. The screw shaft 28 may include a magnet 43. Accordingly, a structure for detecting the end position of the screw shaft 28 may be made simple and compact. Accordingly, a main body housing 11 including an end position sensor 42 may be made compact.

As shown in FIGS. 1 and 5, the end position sensor 42 may include an operation part 44*a* extending outward of the main body housing 11. Accordingly, a user can displace a position of the end position sensor 42 by shifting a position of the operation part 44*a* from outside of the main body housing 11 using their finger. Because of this configuration, an end position sensor 42 can be easily moved to a target position.

As shown in FIG. 1, the tube expansion tool 1 may include a grip 5 extending downward from the main body housing 11. The operation part 44*a* may project upward from an upper surface of the main body housing 11. Accordingly, the operation part 44*a* can be arranged on an upper side of the main body housing 11 such that the user can easily view the operation part 44*a*.

As shown in FIG. 5, the tube expansion tool 1 may include the jaw rotation mechanism 30 that rotates the plurality of jaws 4 in a circumferential direction due to the rotation output of the electric motor 21. The controller 45 (shown in FIG. 1) may supply a current to the electric motor 21 based on the first upper limit value or the second upper limit value. The first upper limit value may be set as an upper limit of a current flowing to the electric motor 21 when the operation is in a rotation zone, in which the jaws 4 are to be rotated. The second upper limit value may be set as an upper limit of a current flowing to the electric motor 21 when the operation is in an expansion zone, in which the jaws 4 are to be opened radially outward relative to each other. That is, an upper limit of a current flowing to the electric motor 21 may be changed depending on the intended operation state, for instance the current may be changed depending on whether the operation is in the rotation zone and the expansion zone. Because of this configuration, for example, when the jaws 4 become un-rotatable or it becomes undesirable to rotate the jaws 4, the electric motor 21 may be prevented from continuing to be driven during certain portions of the operation. As a result, an excessive force may be prevented from being applied to, for example, the jaws 4, the wedge 3, the fluid pipe, and/or the jaw rotation mechanism 30.

As shown in FIG. 14, the tube expansion tool 1 may include the rotation number detection sensor 21, which may be configured to detect a number of rotations of the electric motor 21 and transmit a corresponding signal to the controller 45. The controller 45 may define the rotation zone and the expansion zone based on the corresponding signal from the rotation number detection sensor 21*d* and detection signals relating to a position of the screw shaft 28, e.g., the end position and/or the initial position of the screw shaft 28. Because of this configuration, when an end position of the screw shaft 28 is changed, for instance by moving a position of the end position sensor 42, the rotation zone and the expansion zone can be re-defined. As a result, a rotation operation and an expansion operation of the jaws 4 can be preferably controlled such that, for example, the fluid pipe can be expanded to a desired expansion width according to a contraction speed of the fluid pipe.

The first upper limit value of the current flowing to the electric motor 21, an example of which is shown in FIG. 5, may be set lower than the second upper limit value. Accordingly, an upper limit of a current flowing to the electric motor 21 may be set lower when the operation is in the rotation zone, which is a portion of the operation in which is desirable that a smaller load force is applied to the jaws 4 and the jaw rotation mechanism 30. As a result, the electric motor 21 can be prevented from being excessively driven when the operation is in the rotation zone. Also, a load force applied to the jaws 4 and the jaw rotation mechanism 30 may be minimized.

As shown in FIGS. 5-7, the rotation zone may be a zone in which the wedge 3 moves forward and in this example is set to be prior to when the operation enters the expansion zone. Accordingly, the plurality of jaws 4 may expand radially outward relative to each other after they have rotated in the circumferential direction of the wedge 3. By clearly separating the rotation operation and the expansion operation of the jaws 4, an unnecessary and accidental load force can be prevented from being applied to the jaws 4 and the jaw rotation mechanism 30.

Alternatively, referring to FIGS. 5-7, the rotation zone may be a zone in which the wedge 3 moves rearward and after the operation has exited the expansion zone. Accordingly, the plurality of jaws 4 may rotate in the circumferential direction of the wedge 3 after the jaws 4 have closed radially inward relative to each other. In this case, because the rotation operation and the expansion operation of the jaws 4 are clearly separated, an accidental load force can be prevented from being applied to the jaws 4 and the jaw rotation mechanism 30.

As shown in FIG. 5, a plurality of balls 28*b* may be placed between and engage with the screw shaft 28 and the female screw member 27. Accordingly, the transmission efficiency of a driving force may be improved by the plurality of balls 28*b* placed between the screw shaft 28 and the female screw member 27. As a result, the rotation drive power of the female screw member 27 may be efficiently converted to the movement of the screw shaft 28 in the front-rear direction.

Figure 15:
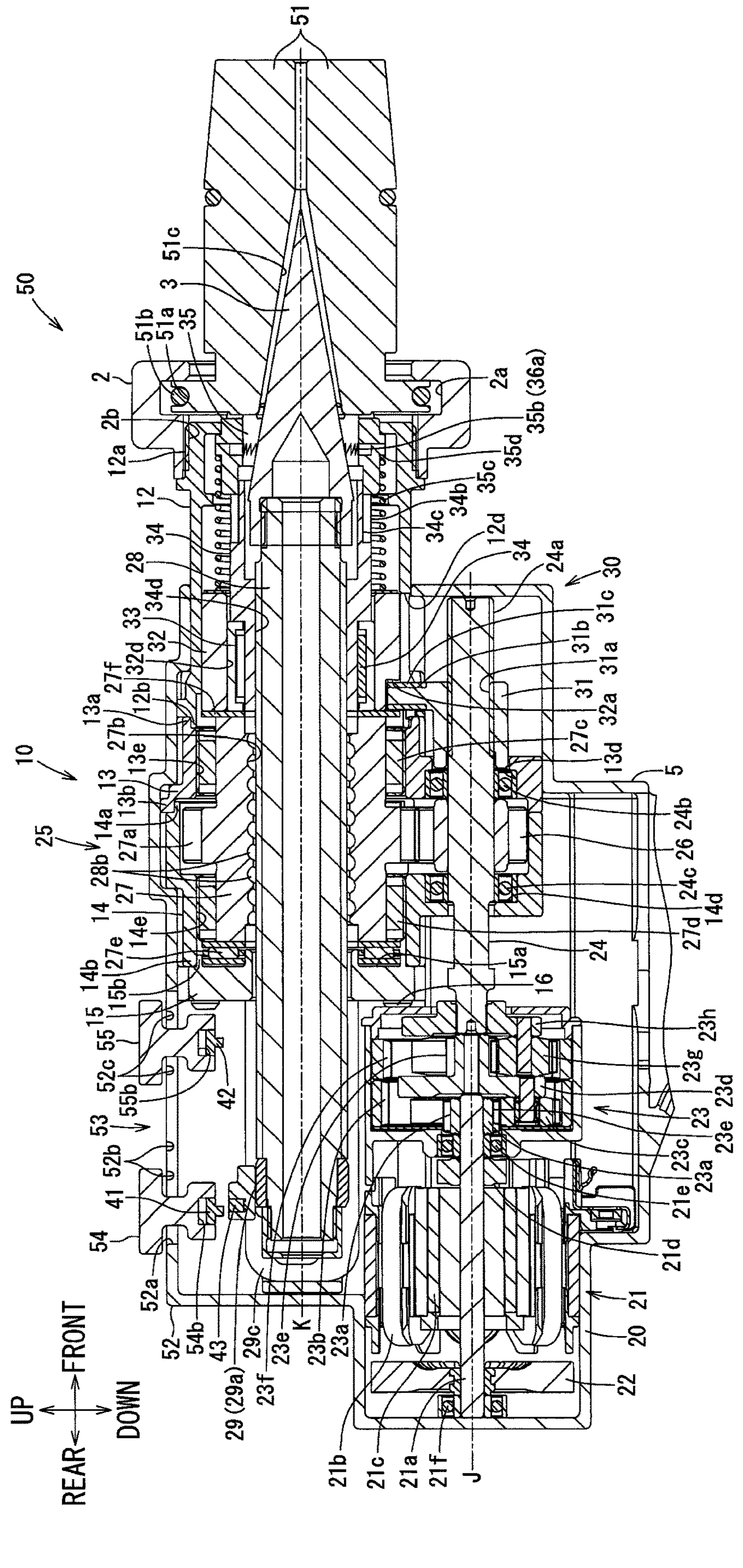
FIG. 15 is a lateral cross-sectional view of a tool main body of a tube expansion tool according to a second embodiment, in which a wedge is located at an initial position.

Next, another embodiment according to the present disclosure will be explained with reference to FIGS. 15-17. As shown in FIG. 15, a tube expansion tool 50 according to a second embodiment may include a sensor positioning mechanism (which is an embodiment of a position adjustment mechanism) 53, instead of the configuration of the position adjustment mechanism 44 of the tube expansion tool 1 according to the first embodiment shown in FIG. 5. The sensor positioning mechanism 53 of the second embodiment may include an initial position operation part 54, which may be used for shifting a position of the initial position sensor 41 in the front-rear direction. Also, the sensor positioning mechanism 53 may include an end position operation part 55, which may be used for shifting a position of the end position sensor 42 the front-rear direction. In the following explanation, components that more substantially differ from those of the tube expansion tool 1 of the first embodiment will be explained in detail.

Figure 16:
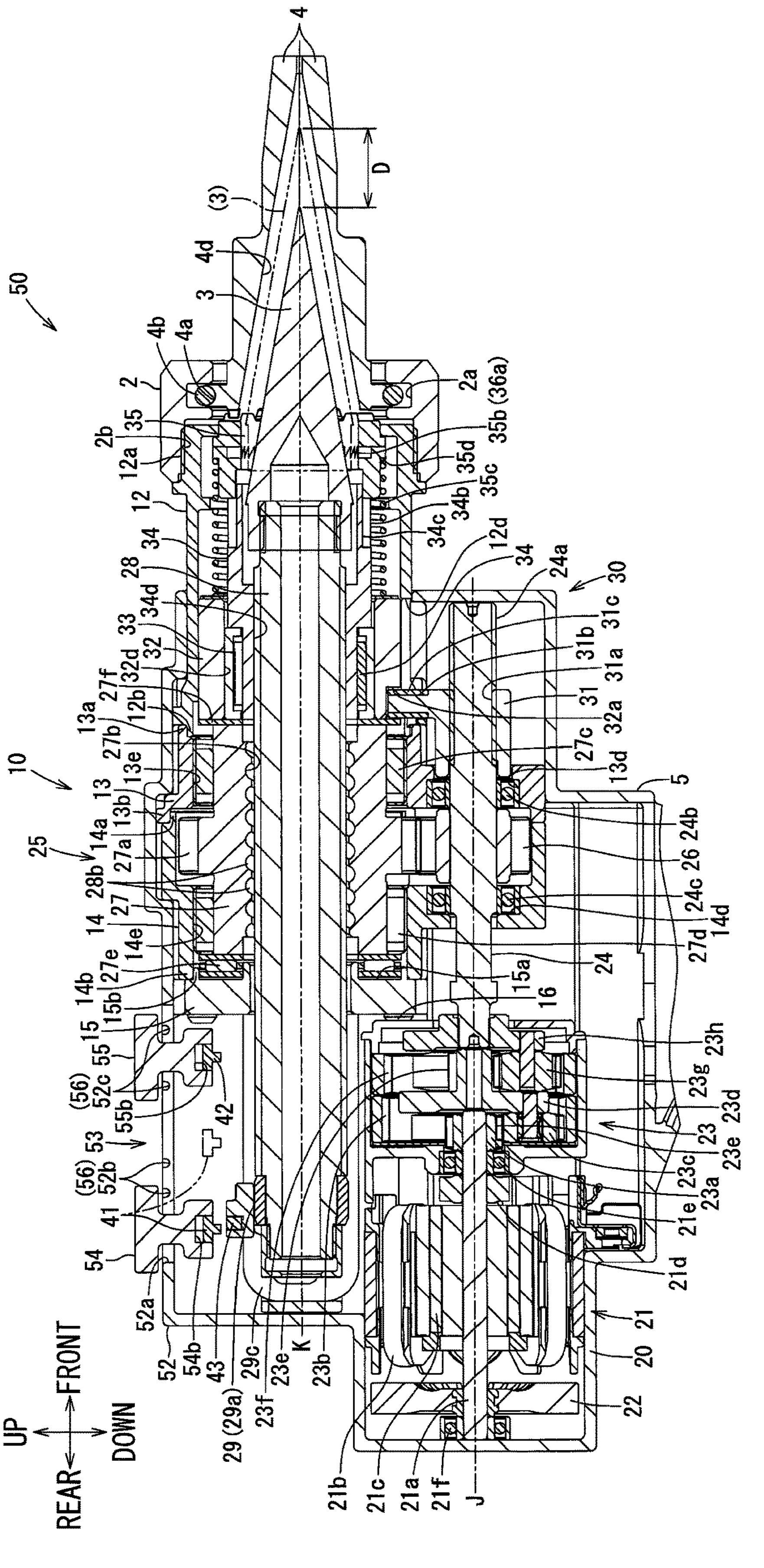
FIG. 16 is a lateral cross-sectional view of a tool main body of the tube expansion tool according to the second embodiment, in which a jaw different from that in FIG. 15 is attached to the tool and the wedge is located at the same position as shown in FIG. 15.

As shown in FIGS. 15 and 16, instead of the plurality of jaws 4 of the first embodiment, a second plurality of jaws 51 may instead be attached to a front portion of the tube expansion tool 50. The first plurality of jaws 4 can be used when expanding a fluid pipe having, for example, a 0.5, 0.75, or 1 inch nominal diameter. In contrast, the second plurality of jaws 51 may be used when expanding a fluid pipe having, for example, a 1.5 inch nominal diameter. When a fluid pipe is expanded by either set of the plurality of jaws 4, 51, the plurality of jaws 4, 51 may receive a force to push them radially outward from the wedge 3, thereby allowing them to expand the fluid pipe. Accordingly, a reaction force radially inward from the fluid pipe, which is derived from expansion of the fluid pipe, will also be received. Because of this, a bending force may be applied to each set of the plurality of jaws 4, 51. As a size of the fluid pipe becomes larger, a bending force may become larger. Accordingly, a thickness of each of the plurality of jaws 51 in a radial direction may be made large in order to improve its durability against the bending force.

As shown in FIG. 15, a ring holding groove 51*a* having an arc shape in cross section may be formed on an outer circumferential surface of a rear portion of each of the second plurality of jaws 51. Each of the ring holding grooves 51*a* may be combined to form an annular groove in an integrally continuous manner. The plurality of jaws 51 may be combined in a circumferential direction by an elastically extendible ring 51*b* that is inserted into the ring holding groove 51*a*. The ring 51*b* may be allowed to move in a radial direction and be restricted from moving in the front-rear direction, for instance by the jaw support groove 2*a* formed on the inner circumferential surface of the cap 2. The plurality of jaws 51 may open/close in a radial direction of the ring 51*b* as they are supported by the jaw support groove 2*a*.

Referring to FIGS. 15 and 16, the cap 2 linked to the first plurality of jaws 4 may be removed from the male screw 12*a* of the front side mechanism housing 12, and then the cap 2 linked to the second plurality of jaws 51 may engage the male screw 12*a* of the front side mechanism housing 12. In this manner, the first plurality of jaws 4 can be replaced with the second plurality of jaws 51.

Referring to FIG. 15, there may be a situation where an initial position of the wedge 3 is fixed to a position in which the wedge 3 is near to an inner circumferential wall 51*c* of the second plurality jaws 51. However, as shown in FIG. 16, when the first plurality of jaws 4 are attached to the tool 50 to replace the second plurality of jaws 51, a distance D may be generated between the wedge 3 and the inner circumferential wall 4*d* of the first plurality of jaws 4. In this case, while the wedge 3 moves within the distance D from the initial position, the wedge 3 may not contact the plurality of jaws 4, which results in the plurality of jaws 4 not opening radially outward during such time. Because of this, a time taken to open/close the plurality of jaws 4 per cycle may be long, for instance in proportion to the distance D. In the tube expansion tool 50 of the present disclosure however, an initial position of the wedge 3 and the screw shaft 38 can be changed by shifting the initial position sensor 44 in the front-rear direction. As shown by an imaginary line of FIG. 16, an initial position of the wedge 3 can be change to a position in which the wedge 3 is nearer to an inner circumferential wall of the jaws 4.

Figure 17:
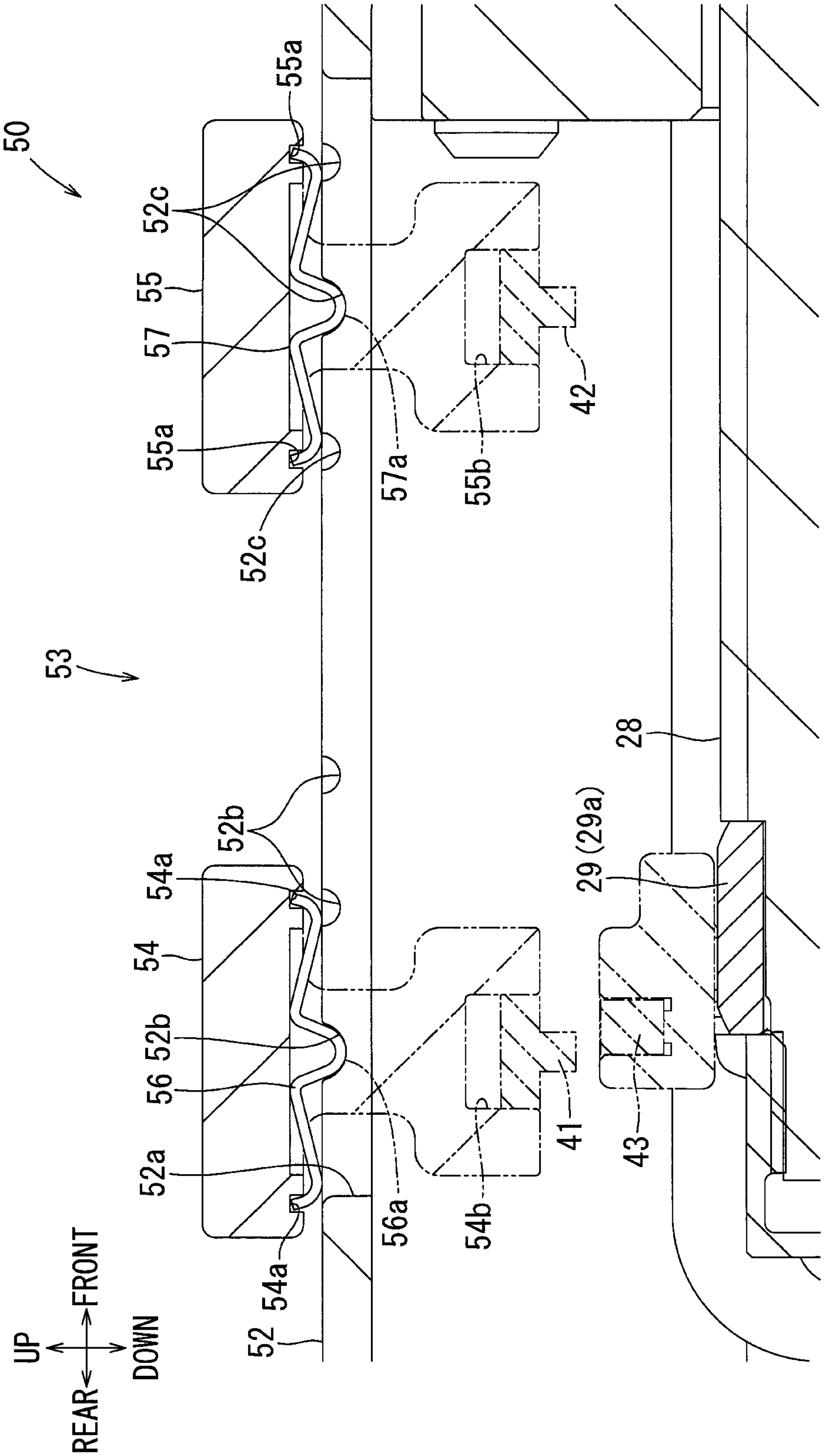
FIG. 17 is a lateral cross-sectional view of a sensor positioning mechanism.

As shown in FIG. 17, the initial position operation part 54 may be slidable along an groove hole 52*a* of a main body housing 52 in the front-rear direction. A sensor holding portion 54*b* that holds the initial position sensor 41 may be provided below the initial position operation part 54. An upper portion of the initial position operation part 54 may be formed in an approximately rectangular plate shape positioned above an upper side of the groove hole 52*a* and may generally extend along the groove hole 52*a* in a left-right direction. A spring holding groove 54*a* may be formed on each of a front side and a rear side of a lower surface of the upper portion of the initial position operation part 54. Each end of a leaf spring 56 may be inserted into a corresponding spring holding groove 54*a* such that the leaf spring 56 may be prevented from falling off. The leaf spring 56 may be formed in an approximately M shape and may include an engagement portion 56*a* projecting downward from a center of the leaf spring 56. A lower portion of the engagement portion 56*a* may have an arc shape. The engagement portion 56*a* of the leaf spring 56 may be movable in the up-down direction by the elasticity of the leaf spring 56 retained by the initial position operation part 54.

As shown in FIG. 17, the end position operation part 55 may be slidable along the groove hole 52*a* of the main body housing 52 in the front-rear direction. The end position operation part 55 may have approximately the same shape as the initial position operation part 54. A sensor holding portion 55*b* that holds the end position sensor 42 may be provided below the end position operation part 55. A spring holding groove 55*a* may be formed on each of a front side and a rear side of a lower surface of an upper portion of the end position operation part 55. Each end of a leaf spring 57 may be inserted into a pair of the spring holding groove 55*a* such that the leaf spring 57 is prevented from falling off. The leaf spring 57 may have approximately the same shape as the other leaf spring 56 and may include an engagement portion 57*a* projecting downward from a center of the leaf spring 57. A lower portion of this engagement portion 57*a* may have an arc shape. The engagement portion 57*a* of the leaf spring 57 may be movable in the up-down direction by the elasticity of the leaf spring 57 retained by the end position operation part 55.

As shown in FIG. 17, a plurality of engagement recesses 52*b*, 52*c* may be formed beside the groove hole 52*a* of the main body housing 52. The engagement recesses 52*b*, 52*c* may be formed in a recessed and hemispherical shape projecting downward from an upper surface and toward a lower surface of the main body housing 52. The plurality of engagement recesses 52*b* corresponding to the initial position operation part 54 may be arranged at predetermined intervals in the front-rear direction nearer a rear portion of the groove hole 52*a*. Similarly, the plurality of engagement recesses 52*c* corresponding to the end position operation part 55 may be arranged at predetermined intervals in the front-rear direction nearer a front portion of the groove hole 52*a*.

As shown in FIG. 17, when the engagement portion 56*a* moves to the a position corresponding to one of the plurality of the engagement recesses 52*b* in the front-rear direction, the engagement portion 56*a* may move downward to elastically engage the one of the plurality of the engagement recesses 52*b*. In this manner, the initial position operation part 54 can be positioned at a desired position in the front-rear direction. When a force more than a predetermined force is applied to the initial position operation part 54 in the front-rear direction, the engagement portion 56*a* may disengage from the engagement recess 52*b*, which may allow the initial position operation part 54 to be slid in the front-rear direction. In this manner, the initial position operation part 54 can be movably positioned at any one of the desired position in the front-rear direction, with a click feeling occurring at certain positions. For example, when the first plurality of jaws 4, each of which has a thinner thickness in a radial direction, is attached to a front portion of the tube expansion tool 50, the initial position operation part 54 may be moved to a forward position. In contrast, when the second plurality of jaws 51, each of which has a thicker thickness in a radial direction, is attached to a front portion of the tube expansion tool 50, the initial position operation part 54 may be moved to a rearward position.

As shown in FIG. 17, similarly to the above engagement portion 56*a*, when the engagement portion 57*a* corresponding to the end position operation part 55 moves to a position corresponding to one of the plurality of the corresponding engagement recesses 52*c* in the front-rear direction, the engagement portion 57*a* may move downward to elastically engage the one of the plurality of the engagement recesses 52*c*. In this manner, the end position operation part 55 can be positioned at a desired position in the front-rear direction. When a sufficient force is applied to the end position operation part 55 in the front-rear direction, the engagement portion 57*a* may disengage from the engagement recess 52*c*, which may allow the end position operation part 55 to be slidable in the front-rear direction. In this manner, the end position operation part 55 can be movably positioned at any one of the desired position in the front-rear direction, with a click feeling occurring at certain positions. For example, when a contraction speed of the fluid pipe is high at a high ambient temperature, the end position operation part 55 may be moved to a forward position. In contrast, when a contraction speed of the fluid pipe is low at a low ambient temperature, the end position operation part 55 may be moved to a rearward position.

As described above, the tube expansion tool 50 that is configured to expand an end portion of a synthetic resin made fluid tube may include a controller 45 (refer to FIG. 1) that switches the rotation of an output shaft 21*a* of the electric motor 21 between a forward and reverse direction, as shown in FIG. 16. The tube expansion tool 50 may include a female screw member 27 that is rotated by the electric motor 21. The tube expansion tool 50 may include a screw shaft 28 that engages with the female screw member 27 and moves forward and rearward between a rearward initial position and a forward end position due to rotation of the male screw member 27. The tube expansion tool 50 may include a wedge 3 that extends forward from the screw shaft 28. The tube expansion tool 50 may include a plurality of jaws 4 that are opened radially outward by being pushed by the wedge 3 when the wedge 3 and the screw shaft 28 move forward. The tube expansion tool 50 may include an end position sensor 42 that detects whether the screw shaft 28 at the end position and transmits a corresponding signal to the controller 45. The tube expansion tool 50 may also include an initial position sensor 41 that detects whether the screw shaft 28 at the initial position and transmits a corresponding signal to the controller 45. The end position sensor 42 and the initial position sensor 41 may be arranged so as to be movable in the front-rear direction. An end position and an initial position of the screw shaft 28 may be movable by displacing a position of the end position sensor 42 and a position of the initial position sensor 41, respectively.

Because of the above configuration, by moving the initial position sensor 41 forward, an initial position of the wedge 3 may be positioned in a more forward position. Accordingly, a time period from a time when the wedge 3 starts from the initial position to a time when the wedge 3 reaches the plurality of jaws 4 may be reduced. As a result, a time taken to open/close the plurality of jaws 4 per cycle may be reduced, which in turn causes an overall operation time to be reduced. Furthermore, by moving the initial position sensor 41 rearward, an initial position of the wedge 3 may be positioned in a more rearward position. Accordingly, for example, when the second plurality of jaws 51, each of which has a thicker thickness in a radial direction, are used, an initial position of the wedge 3 may be positioned in a more rearward position such that the wedge 3 does not interfere with the plurality of jaws 51.

As shown in FIGS. 15 and 16, the initial position sensor 41 and the end position sensor 42 may include an initial position operation part 54 and an end position operation part 55, respectively, both of which extend outward of the main body housing 11. Because of this configuration, a user may shift the initial position sensor 41 and the end position sensor 42 by operating the initial position operation part 54 and the end position operation part 55, respectively, from outside of the main body housing 11. Thus, the user may easily shift either or both of the initial position sensor 41 and the end position sensor 42 to a desired position.

As shown in FIGS. 15 and 16, the second plurality of jaws 51, each of which has a different thickness than the thickness of each of the first plurality of jaws 4 in a radial direction, can be attached to the tube expansion tool 50 instead of the first plurality of jaws 4. Accordingly, various kinds of fluid pipes having different nominal diameters can be expanded using the same tube expansion tool 50.

As shown in FIG. 17, the tube expansion tool 50 may include a sensor positioning mechanism 53 by which the initial position sensor 41 and/or the end position sensor 42 can be releasably positioned at a plurality of desired positions in the front-rear direction. Accordingly, the initial position sensor 41 can be positioned such that an initial position of the wedge 3 can be positioned at a desired position, with an additional indication that the initial position sensor 41 is at one of a number of selected predetermined positions. Also, the end position sensor 42 can be positioned such that an end position of the wedge 3 can be positioned at a desired position, with an additional indication that the end position sensor 42 is at one of a number of selected predetermined positions. Accordingly, a user may not need to fine-adjust an initial position and/or an end position of the wedge 3, which improves usability of the tube expansion tool 50. Also, once the initial position sensor 41 and/or the end position sensor 42 is at the desired positioned, it/they may be prevented from inadvertently moving.

Next, another embodiment according to the present disclosure will be explained below with reference to FIG. 18. A tube expansion tool 60 according to a third embodiment may include a sensor positioning mechanism (which is an embodiment of a position adjustment mechanism) 61, instead of the sensor positioning mechanism 53 of the tube expansion tool 50 according to the second embodiment shown in FIG. 16. The sensor positioning mechanism 61 of the third embodiment may include an initial position operation part 62 used for shifting a position of the initial position sensor 41 in the front-rear direction. Also, the sensor positioning mechanism 61 may include an end position operation part 63 used for shifting a position of the end position sensor 42 in the front-rear direction. In the following explanation, components that substantially differ from those of the tube expansion tools 1, 50 according to the first and second embodiment will be explained in detail.

Figure 18:
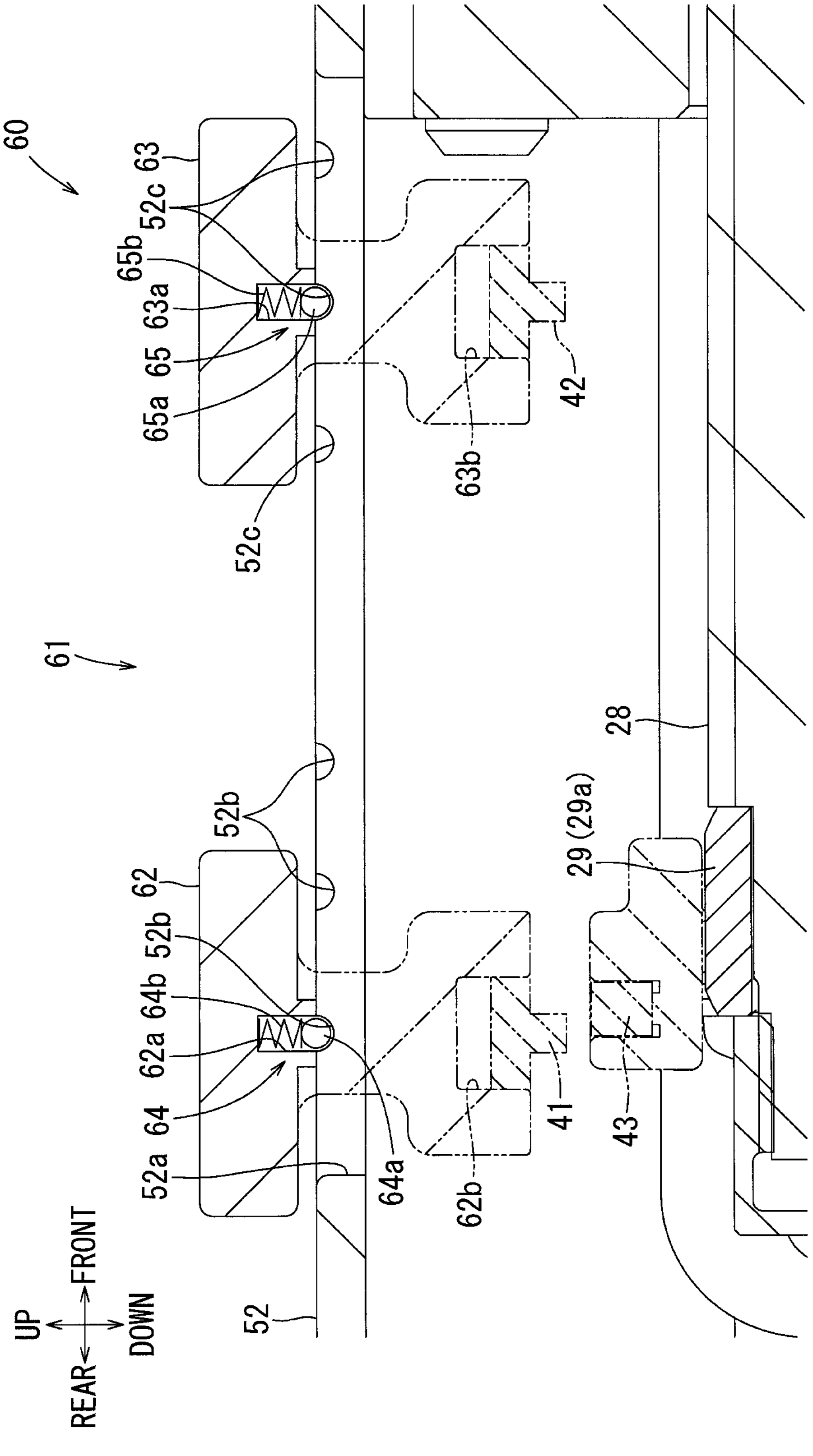
FIG. 18 is a lateral cross-sectional view of a sensor positioning mechanism of a tube expansion tool according to a third embodiment.

As shown in FIG. 18, the initial position operation part 62 may be slidable along an groove hole 52*a* of a main body housing 52 in the front-rear direction. A sensor holding portion 62*b* that holds the initial position sensor 41 may be provided at a lower portion the initial position operation part 62. An upper portion of the initial position operation part 62 may be formed in an approximately rectangular plate shape and may be positioned above an upper side of the groove hole 52*a*. The upper portion of the initial operation position part 62 may generally extend from the groove hole 52*a* in a left-right direction. A ball holding groove 62*a* extending upward in a groove hole shape may be formed on a lower surface of the upper portion of the initial position operation part 62. A ball plunger 64 may be housed in the ball housing groove 62*a* such that the ball plunger 64 does not easily fall out. The ball plunger 64 may include a ball 64*a* that is retained so as to be projectable from a lower end of the ball housing groove 62*a*. Also, the ball housing groove 62*a* may include a compression spring 64*b* that biases the ball 64*a* downward.

As shown in FIG. 18, the end position operation part 63 may be slidable along the groove hole 52*a* of the main body housing 52 in the front-rear direction. The end position operation part 63 may be formed in approximately the same shape as the initial position operation part 62. A sensor holding portion 63*b* that holds the end position sensor 42 may be provided at a lower portion of the end position operation part 63. A ball holding groove 63*a* extending upward in a groove hole shape may be formed on a lower surface of the upper portion of the end position operation part 63. A ball plunger 65 may be housed in the ball housing groove 63*a* such that the ball plunger 65 may not easily fall out. The ball plunger 65 may include a ball 65*a* that is retained so as to be projectable from a lower end of the ball housing groove 63*a*. Also, the ball housing groove 63*a* may include a compression spring 65*b* that biases the ball 65*a* downward.

As shown in FIG. 18, when the ball 64*a* of the ball plunger 64 moves to a position corresponding to one of the plurality of the engagement recesses 52*b* in the front-rear direction, the ball 64*a* may move downward to elastically engage the one of the plurality of the engagement recesses 52*b*. In this manner, the initial position operation part 62 can be positioned at a desired position in the front-rear direction. When a force more than a predetermined force is applied to the initial position operation part 62 in the front-rear direction, the ball 64*a* may disengage from the engagement recess 52*b*, which allows the initial position operation part 62 to be slidable in the front-rear direction. In this manner, the initial position operation part 62 can be movably positioned at any desired position in the front-rear direction, with certain positions providing a click feeling. For example, the initial position operation part 62 may be moved based on a kind of the plurality of jaws (e.g., based on their thickness in a radial direction and/or their size) attached to the tube expansion tool 60.

As shown in FIG. 18, when the ball 65*a* of the ball plunger 65 moves to a position corresponding to one of the plurality of the engagement recesses 52*c* in the front-rear direction, the ball 65*a* may move downward to elastically engage the one of the plurality of the engagement recesses 52*c*. In this manner, the end position operation part 63 can be positioned at a desired position in the front-rear direction. When a force more than a predetermined force is applied to the end position operation part 63 in the front-rear direction, the ball 65*a* may disengage from the engagement recess 52*c*, which allows the end position operation part 63 to be slidable in the front-rear direction. In this manner, the end position operation part 63 can be movably positioned at any desired position in the front-rear direction, with certain positions providing a click feeling. For example, the end position operation part 63 may be moved based on an ambient temperature.

Next, another embodiment according to the present disclosure will be explained below with reference to FIG. 19. A tube expansion tool 70 according to a fourth embodiment may include a sensor positioning mechanism (which is an embodiment of a position adjustment mechanism) 71 that automatically moves the initial position sensor 41 and/or the end position sensor 42 in the front-rear direction. The sensor positioning mechanism 71 may include an initial position operation part 72 that holds the initial position sensor 41 so as to be movable in the front-rear direction and may also include an end position operation part 73 that holds the end position sensor 42 so as to be movable in the front-rear direction. In the following explanation, some components that substantially differ from those of the tube expansion tool 1 according to the first embodiment will be explained in detail.

Figure 19:
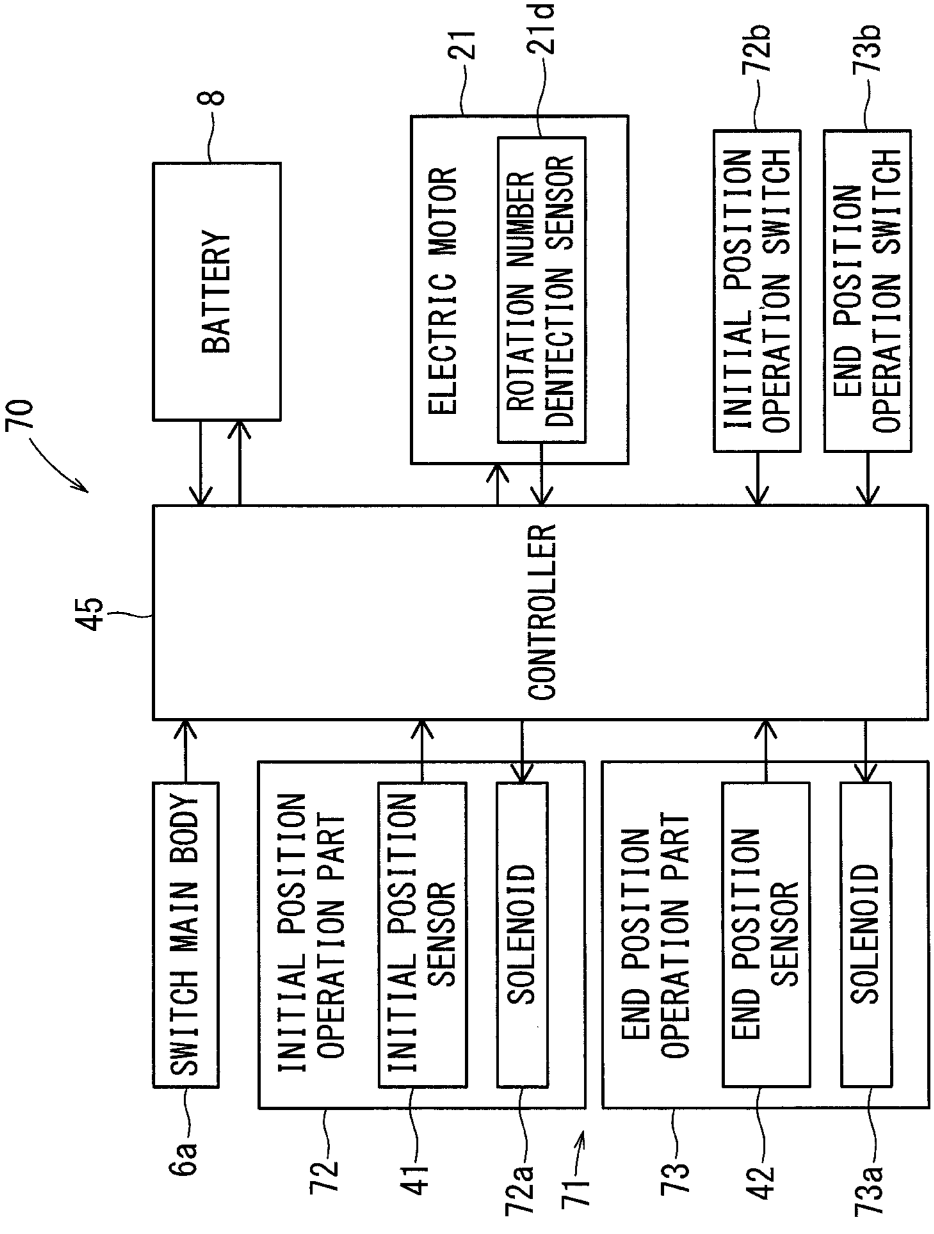
FIG. 19 is a block diagram of electrical components of a tube expansion tool according to a fourth embodiment.

As shown in FIG. 19, the initial position operation part 72 may include a solenoid 72*a*. The solenoid 72*a* may be actuated by operating an initial position operation switch 72*b*. When the solenoid 72*a* is activated, the initial position sensor 41 and the initial position operation part 72 may move forward or rearward. The solenoid 72*a* may be activated for a predetermined time period, for instance for a period of time that would allow the initial position sensor 41 to be moved to a predetermined position. After that, the solenoid 72 may be deactivated. The initial position operation switch 72*b* may be, for example, a push button, a toggle switch, or a dial switch. The initial position operation switch 72*b* may be arranged on the grip 5 (refer to FIG. 1), although it could be positioned elsewhere. Information relating to a plurality of positions to which the initial position sensor 41 could be moved may be previously stored in a memory of the controller 45 based on, for example, the kinds of jaws expected to be attached to the tube expansion tool 70.

As shown in FIG. 19, the end position operation part 73 may include a solenoid 73*a*. The solenoid 73*a* may be actuated by operating an end position operation switch 73*b*. When the solenoid 73*a* is activated, the end position sensor 42 and the end position operation part 73 may move forward or rearward. The solenoid 73*a* may be activated for a predetermined time period, for instance for a period of time that would allow the end position sensor 42 to be moved to a predetermined position. After that, the solenoid 73 may be deactivated. The end position operation switch 73*b* may be structured in substantially a similar manner as the initial position operation switch 72*b* and may be arranged beside the initial position operation switch 72*b*. Information relating to a plurality of positions to which the end position sensor 42 could be moved may be previously stored in the memory of the controller 45 based on, for example, an expected contraction speed of the fluid pipe at several different ambient temperatures.

Next, another embodiment according to the present disclosure will be explained below with reference to FIG. 20. A tube expansion tool 80 according to a fifth embodiment may include a sensor positioning mechanism (which is an embodiment of a position adjustment mechanism) 81 that automatically moves the initial position sensor 41 and/or the end position sensor 42 in the front-rear direction. The sensor positioning mechanism 81 may include an initial position operation part 72 that holds the initial position sensor 41 so that the initial position sensor 41 is movable in the front-rear direction. The sensor positioning mechanism 81 may also include an end position operation part 73 that holds the end position sensor 42 so that the end position sensor 42 is movable in the front-rear direction. In the following explanation, some components that more substantially differ from those in the tube expansion tools 1, 70 according to the first and fourth embodiments will be explained in detail.

Figure 20:
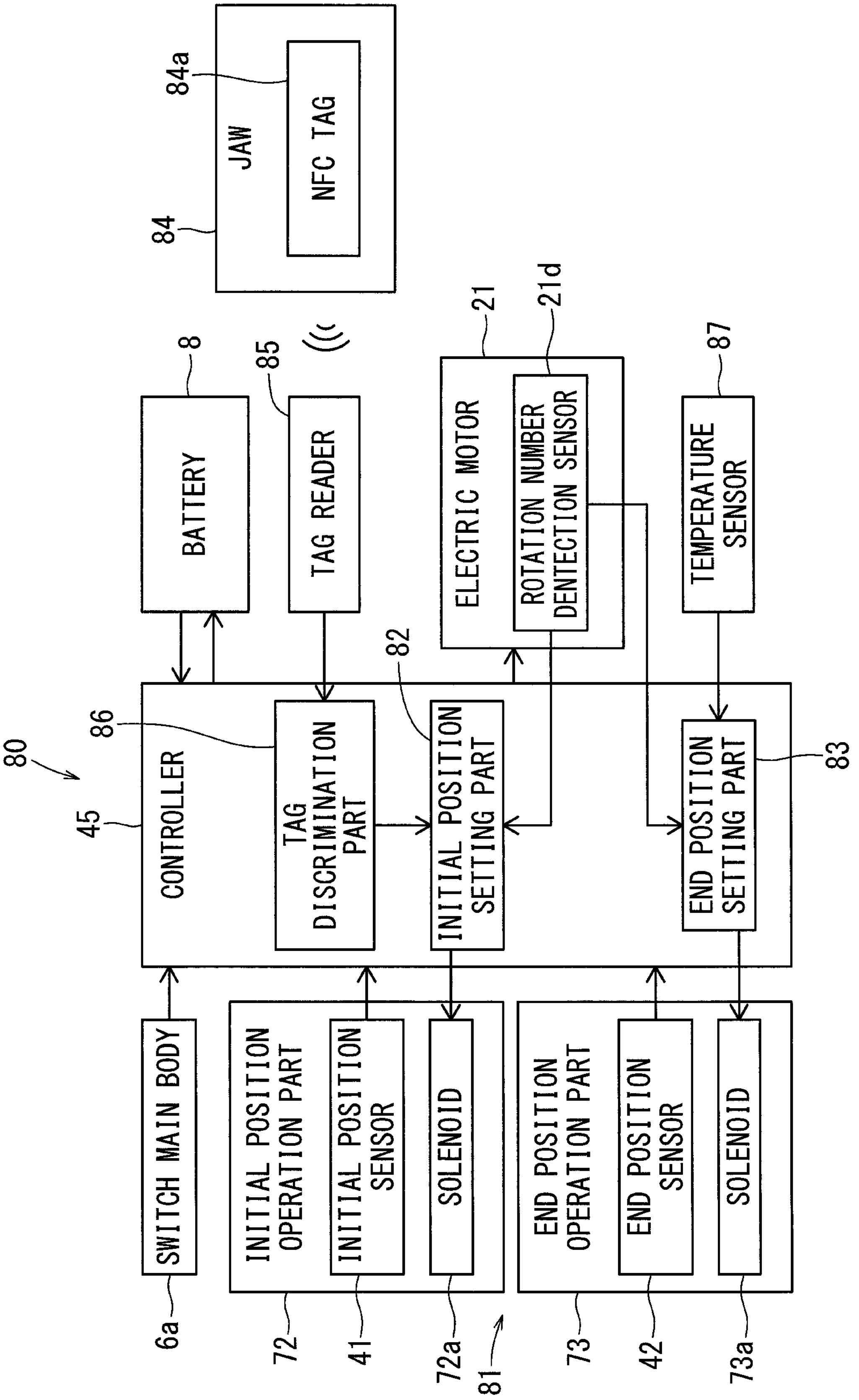
FIG. 20 is a block diagram of electrical components of a tube expansion tool according to a fifth embodiment.

As shown in FIG. 20, the tube expansion tool 80 may include a tag reader 85. The tag reader 85 may be provided in, for example, a front portion of the tool main body (refer to FIG. 1), a portion to which the cap 2 holding a plurality of jaws 84 can be attached. A NFC (Near Field Communication) tag 84*a* may be attached to the plurality of jaws 84 or the cap 2 (refer to FIG. 1). The tag reader 85 can read information stored in the NFC tag 84*a* via wireless communication.

As shown in FIG. 20, the controller 45 may include an initial position setting part 82, an end position setting part 83, and a tag discrimination part 86. The tag discrimination part 86 may determine features of jaws 84 from the information obtained by the tag reader 85, which was stored on the NFC tag 84*a*. The initial position setting part 82 may set an initial position (refer to FIG. 5) of the wedge 3 and the screw shaft 28, based on the kind of jaws that the tag discrimination part 86 has determined are present and may also determine the number of rotations (e.g., based on the rotation angle) of the electric motor 21 that the rotation number detection sensor 21*d* should detect. The solenoid 72*a* of the initial position operation part 72 may move the initial position sensor 41 to the initial position that has been set by the initial position setting part 82.

As shown in FIG. 20, the tube expansion tool 80 may include a temperature sensor 87 that detects an ambient temperature. The end position setting part 83 may set an end position of the wedge 3 and the screw shaft 28, based on the detected temperature detected by the temperature sensor 87 and may also set the number of rotations (e.g., based on the rotation angle) of the electric motor 21 that the rotation number detection sensor 21*d* should detect. The solenoid 73*a* of the end position operation part 73 may move the end position sensor 42 to the end position that has been set by the end position setting part 82.

Next, another embodiment according to the present disclosure will be explained below with reference to FIG. 21. A tube expansion tool 90 according to a sixth embodiment may include a sensor positioning mechanism (which is an embodiment of a position adjustment mechanism) 91 that automatically moves the initial position sensor 41 and/or the end position sensor 42 in the front-rear direction. The tube expansion tool 90 may include a bus current measurement part 92, instead of the tag reader 85 and the tag discrimination part 86 according to the fifth embodiment shown in FIG. 20. The bus current measurement part 92 may monitor a bus current (e.g., a drive current) that is supplied to the electric motor 21.

Figure 21:
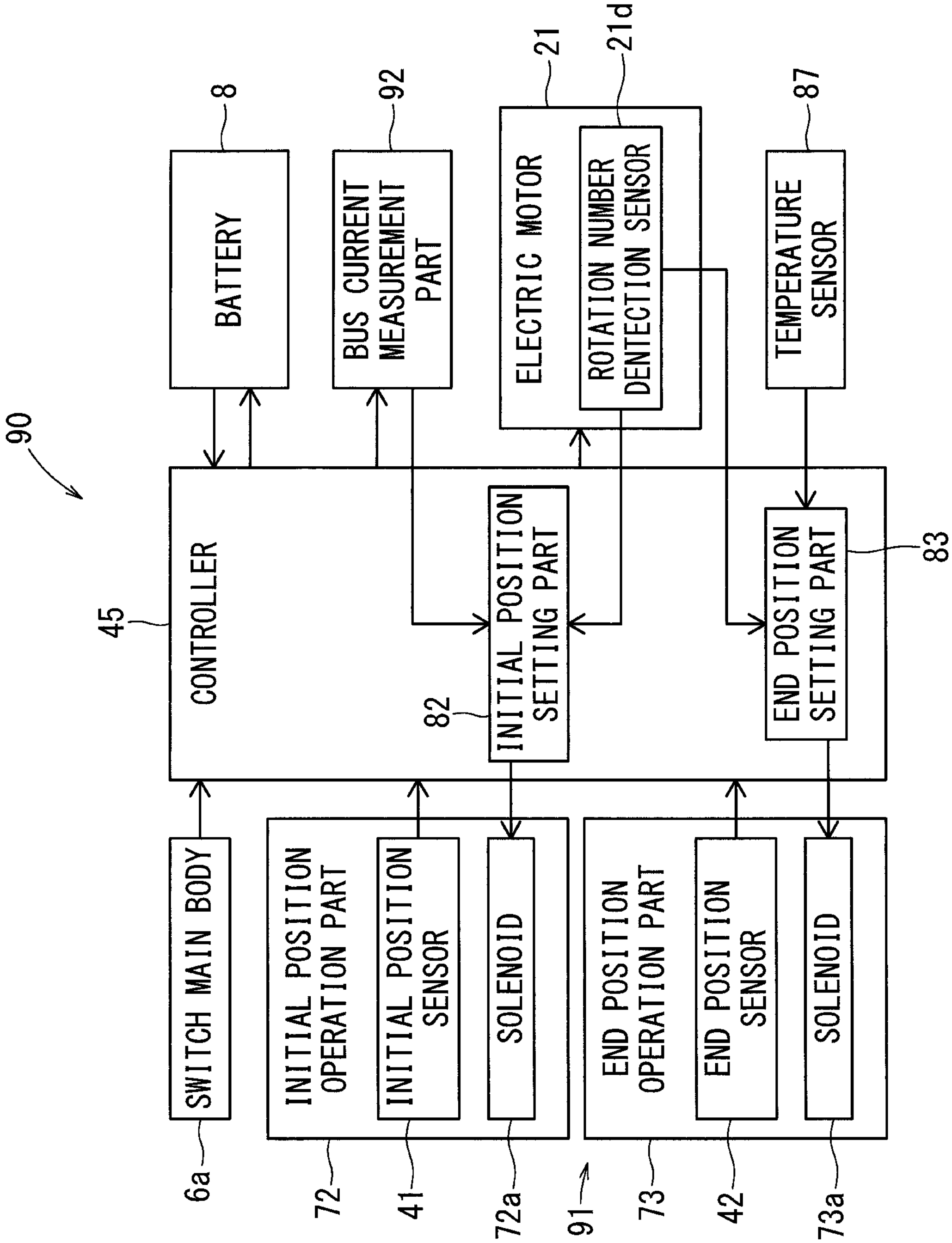
FIG. 21 is a block diagram of electrical components of a tube expansion tool according to a sixth embodiment.

As shown in FIG. 21, a certain kind of jaws may be attached to the tube expansion tool 90 at first, and then the switch main body 6*a* may be turned on to drive the electric motor 21. The bus current measurement part 92 may measure a bus current. The initial position setting part 82 may determine what kind of jaws is attached to the tube expansion tool 90 based on, for example, a maximum value of the bus current and a total bus current power of the bus current, both of which may be monitored by the bus current measurement part 92. For example, when the plurality of jaws are opened radially outward, the bus current may increase. And when the plurality of jaws are opened to a maximum, a bus current may be at its maximum. In contrast, when the plurality of jaws are closed radially inward, a bus current may decrease. The initial position setting part 82 may determine the kind of jaws (e.g., relating to their thickness in a radial direction and/or size), based on variation characteristics of the bus current. For example, a length of time it takes from when the electric motor 21 has started being operated (for instance with the screw shaft 28 being positioned in the rearmost initial position) to when the bus current has increased to a certain level, or the rate of the increase indicating that the wedge 3 is pressing against the jaws, may be determined. This variation characteristic of the bus current could be different based on the kind of jaws attached. For example, the length of time would be shorter for the configuration shown in FIG. 15 compared to that shown in FIG. 16. Other methods may also be used. For example, the maximum bus current for one operation cycle may be measured, the measurement of which could indicate the kind of jaws being used. Also, the initial position setting part 82 may set an initial position of the wedge 3 and the screw shaft 28 (refer to FIG. 5) based on the determined kind of jaws. The solenoid 72*a* may move the initial position sensor 41 to the initial position set by the initial position setting part 82. As long as it is determined that the same kind of the plurality of jaws are being used, an initial position of the wedge 3 and the screw shaft 28 may be maintained at the position to which the initial position sensor 41 had moved according to the above procedure.

The embodiments discussed above may be modified in various ways. In the above embodiment, the tube expansion tool 1 may include six jaws 4. Instead of this, the tube expansion tool 1 may include, for example, five or less jaws 4, or may include seven or more jaws 4. In the above exemplified embodiment, the electric motor 21 may be arranged below the screw shaft 28 and on a rear upper side of the grip 5. However, instead of this configuration, the electric motor 21 may be arranged above the screw shaft 28 and on the rear upper side of the grip 5. Alternatively, the electric motor 21 may be located entirely within the grip 5.

In the above exemplified embodiments, the first center mechanism housing 13 and the second center mechanism housing 14 may be arranged in the front-rear direction between the front side mechanism housing 12 and the rear side mechanism housing 15. However, instead of this configuration, for example, only one center mechanism housing may be present or more than three center mechanism housings may be arranged between the front side mechanism housing 12 and the rear side mechanism housing 15. In the above exemplified embodiments, the first center mechanism housing 13 and the second center mechanism housing 14 are made of die cast aluminum. However, instead of this, the first center mechanism housing 13 and the second center mechanism housing 14 may be made of another lightweight material, such as die cast magnesium.

In the above exemplified embodiments, the linear movement member 31 may include a protrusion 31*b* projecting radially outward from a side surface of the linear movement member 31, and the power conversion ring 32 may include grooves 32*a*, 32*b* that engage the protrusion 31*b* on the outer circumferential surface of the power conversion ring 32. However, instead of this configuration, for example, a groove may be provided on a side surface of the linear movement member 31, and the power conversion ring 32 may include a protrusion projecting radially outward from an outer circumferential surface of the power conversion ring 32.

In the above exemplified embodiments, the tube expansion tool 1 may include an operation part 44*a* that a user can use to move the end position sensor 42. However, instead of this configuration, there may be provided a movement mechanism that automatically moves the end position sensor 42 based on an ambient temperature detected by a temperature sensor. Also, a motor or a solenoid may be used as the movement mechanism. Furthermore, in the above exemplified embodiment, the main body housing 11 may support the initial position sensor 41 and the end position sensor 42, and the magnet 43 may be attached to the screw shaft 28. However, instead of this configuration, the main body housing 11 may support magnets at positions corresponding to desired initial and end positions, and the screw shaft may include a Hall Effect sensor for detecting the position of the screw shaft 28.

In the above exemplified embodiments, the expansion zone of the jaws 4 may be defined as a portion of the operation after the rotation zone. However, instead of this configuration, the rotation zone may be defined as a portion of the operation after the expansion zone. Furthermore, in the above exemplified embodiments, when the controller 45 detects a predetermined number of rotations of the electric motor 21 that has been previously stored in the memory of the controller 45, the rotation zone of the jaws 4 may be determined to have finished. However, instead of this configuration, a sensor (e.g., a Hall Effect sensor) that detects a position that indicates that the rotation zone of the jaws 4 has finished may be arranged between the initial position sensor 41 and the end position sensor 42.

In the above exemplified embodiments, the feed screw mechanism 25 may move the wedge 3 in the front-rear direction. However, instead of this configuration, for example, a cam that is rotated by rotation of the electric motor 21 may move the wedge 3, and a rotation zone and an expansion zone may be defined by detecting an initial angle and a rotation angle of the cam and/or a number of rotations of the electric motor 21.

In the above exemplified embodiments, the feed screw mechanism 25 may include the plurality of balls 28*b* placed between the screw shaft 28 and the female screw member 27. However, instead of this configuration, for example, a feed screw mechanism may be configured such that the screw shaft 28 directly engages the female screw member 27, without placing the balls 28 therebetween.

Relating to the engagement recesses 52*b*, 52*c* that respectively position the initial position operation part 54 and the end position operation part 55, the number of the recesses 52*b*, 52*c* and the positions of the recesses 52*b*, 52*c* in the front-rear direction may be changed as needed without being limited by the disclosure of the specific embodiments. Also, in the above exemplified embodiments, the engagement portion 56*a* of the leaf spring 56 and the ball 64*a* of the ball plunger 64 may move in the up-down direction. However, instead of this configuration, for example, an engagement portion of the leaf spring and a ball of the ball plunger may move in the left-right direction with regard to a side wall of the groove hole 52*a* formed in the main body housing 52.

In the above exemplified embodiments, a solenoid 72*a* that moves the initial position sensor 41 in the front-rear direction may be used. However, instead of the solenoid 72*a*, for example, an electric motor may be used. Also, instead of the solenoid 73*a* that moves the end position sensor 42 in the front-rear direction, for example, an electric motor may be used.

Furthermore, the sensor positioning mechanism 53, in which the leaf springs 56, 67 are used and the sensor positioning mechanism 61 in which the ball plungers 64, 65 are used, may be applied to any of the tube expansion tools 70, 80, 90 in which the initial position sensor 41 and the end position sensor 42 are automatically moved in the front-rear direction.

Furthermore, instead of the monitoring of the bus current in the tube expansion tool 90, a total number of rotations of the electric motor 21 from a time when the wedge 3 moves from an initial position until a time when the plurality of jaws starts to open radially outward may be detected by the rotation number detection sensor 21*d*. A movement amount of the screw shaft 28 may be calculated by using the total rotation number of the electric motor 21. A zone in which the wedge 3 does not serve to expand the plurality of jaws radially outward may be determined from the movement amount of the screw shaft 28. As a result, an initial position sensor 41 may be shifted and an initial position of the wedge 3 may be newly set such that a zone in which the wedge 3 does not serve to expand the jaws may be reduced. Alternately, an upper/lower limit of the motor current based on the type of jaws attached to the PEX expansion tool can be adjusted. By adjusting a maximum current of the motor, a thinner walled pipe may not be damaged or expansion power of the tool may not be unnecessary limited when working with the thicker walled pipes.

What is claimed is:

1. A tube expansion tool for expanding an end portion of a fluid pipe, comprising:

a main body housing;

an electric motor with an output shaft, the electric motor being housed in the main body housing;

a screw shaft positioned in the main body housing and configured to be movable along a longitudinal axis of the screw shaft extending between a first end and a second end of the screw shaft, which is a direction coaxial with or parallel to an output shaft of the electric motor;

a female screw member configured to move the screw shaft along the longitudinal axis by engaging with the screw shaft and rotating around an axis of the screw shaft;

a gear engaged with the female screw member, the gear being configured to transmit a rotation output of the output shaft of the electric motor to the female screw member;

a spindle configured to rotate integrally with the gear, the spindle being arranged in a direction parallel to the longitudinal axis of the screw shaft;

a wedge extending from a position closer to the second end of the screw shaft than to the first end;

a plurality of jaws coupled to the main body housing so as to be openable/closable, wherein when the wedge moves forward integrally with the screw shaft, the wedge pushes the plurality of jaws so that each jaw of the plurality of jaws opens radially outward relative to each other;

a grip extending downward from the main body housing, wherein the grip is positioned below the electric motor and has a center axis that traverses the longitudinal axis of the screw shaft, and the output shaft of the electric motor transmits rotation to the spindle at a position located between the center axis of the grip and the second end of the screw shaft along a direction of the longitudinal axis of the screw shaft, and a planetary gear reduction mechanism configured to transmit the rotation output of the output shaft of the electric motor to the spindle at the position located between the center axis of the grip and the second end of the screw shaft.

2. The tube expansion tool according to claim 1, wherein a majority of the grip is arranged between the electric motor and the plurality of jaws in the direction parallel to the longitudinal axis of the screw shaft; and the electric motor is arranged below the screw shaft.

3. The tube expansion tool according to claim 2, wherein at least a part of the screw shaft overlaps the grip in the direction parallel to the longitudinal axis of the screw shaft.

4. The tube expansion tool according to claim 1, wherein a portion of the planetary gear reduction mechanism, which is configured to reduce the rotation output of the output shaft, is arranged between the output shaft of the electric motor and the screw shaft.

5. The tube expansion tool according to claim 1, further comprising:

a rotation drive ring linked to a portion of the plurality of jaws; and a jaw rotation mechanism configured to rotate the plurality of jaws in a circumferential direction due to rotation of the rotation drive ring, which is caused by the rotation output of the electric motor, wherein:

the rotation drive ring is positioned closer to the second end of the screw shaft than the female screw member along the longitudinal axis of the screw shaft.

6. The tube expansion tool according to claim 1, further comprising:

a cap that supports the plurality of jaws so that the plurality of jaws can be opened/closed and so that the plurality of jaws are restricted from moving in the direction parallel to the longitudinal axis of the screw shaft;

a second-side mechanism housing, a first center mechanism housing, and a first-side mechanism housing that are arranged in this order from the second end of the screw shaft to the first end of the screw shaft, each of the second-side mechanism housing, the first center mechanism housing, and the first-side mechanism housing being positioned within the main body housing; and a bolt that connects the second-side mechanism housing to the first-side mechanism housing, wherein:

the second-side mechanism housing is made of a material containing iron and is configured to support the cap;

the first-side mechanism housing is made of a material containing iron and is configured to support an end portion of the female screw member; and the first center mechanism housing is made of a material that is lighter in weight than iron.

7. The tube expansion tool according to claim 6, further comprising:

a second center mechanism housing positioned between the first center mechanism housing and the first-side mechanism housing, wherein:

each of the second-side mechanism housing, the first center mechanism housing, the second center mechanism housing, and the first-side mechanism housing includes an engagement portion at each end portion thereof, the engagement portions being positioned such that adjacent end portions are configured to overlap each other in the direction parallel to the longitudinal axis of the screw shaft.

8. The tube expansion tool according to claim 7, wherein:

the first center mechanism housing and the second center mechanism housing each supports a spindle bearing, which are configured to rotatably support the spindle; and the first center mechanism housing and the second center mechanism housing each supports a female screw member bearing, which are configured to rotatably support the female screw member.

9. The tube expansion tool according to claim 6, wherein the first-side mechanism housing supports a thrust bearing that contacts one end of the female screw member.

10. The tube expansion tool according to claim 1, wherein a plurality of balls are placed between and engage with the screw shaft and the female screw member.

11. The tube expansion tool according to claim 7, wherein the first center mechanism and the second center mechanism are made of a material having a density less than that of iron.

12. A tube expansion tool for expanding an end portion of a fluid pipe, comprising:
- a main body housing;
- an electric motor with an output shaft, the electric motor being housed in the main body housing;
- a screw shaft positioned in the main body housing and configured to be movable along a longitudinal axis of the screw shaft extending between a first end and a second end of the screw shaft;
- a female screw member configured to move the screw shaft along the longitudinal axis by engaging with the screw shaft and rotating around an axis of the screw shaft;
- a gear engaged with the female screw member, the gear being configured to transmit a rotation output of the output shaft of the electric motor to the female screw member;
- a spindle configured to rotate integrally with the gear, the spindle extending in a direction parallel to the screw shaft;
- a wedge extending from a position closer to the second end of the screw shaft than to the first end;
- a plurality of jaws coupled to the main body housing so as to be openable/closable, wherein when the wedge moves forward integrally with the screw shaft, the wedge pushes the plurality of jaws so that each jaw of the plurality of jaws opens radially outward relative to each other;
- a grip extending downward from the main body housing, wherein
  - the grip is positioned below the electric motor and has a center axis that traverses the longitudinal axis of the screw shaft, and
  - the output shaft of the electric motor transmits rotation to the spindle at a position located between the center axis of the grip and the second end of the screw shaft along a direction of the longitudinal axis of the screw shaft; and
- a planetary gear reduction mechanism configured to transmit the rotation output of the output shaft of the electric motor to the spindle at the position located between the center axis of the grip and the second end of the screw shaft.

13. The tube expansion tool according to claim 12, wherein at least a portion of the electric motor is positioned closer to the first end of the screw shaft than to the second end of the screw shaft along the longitudinal axis of the screw shaft.

14. The tube expansion tool according to claim 12, wherein at least a part of the screw shaft overlaps the grip in a direction parallel to the longitudinal axis of the screw shaft.

15. The tube expansion tool according to claim 14, wherein the electric motor overlaps at least a portion of the grip in the direction parallel to the longitudinal axis of the screw shaft.

16. The tube expansion tool according to claim 12, further comprising:
- a rotation drive ring linked to a portion of the plurality of jaws; and
- a jaw rotation mechanism configured to rotate the plurality of jaws in a circumferential direction due to rotation of the rotation drive ring, which is caused by the rotation output of the electric motor, wherein:
- the rotation drive ring is positioned closer to the second end of the screw shaft than the female screw member along the longitudinal axis of the screw shaft.

17. The tube expansion tool according to claim 16, further comprising:
- a power conversion ring with a first groove and a second groove, both of which are formed in a recessed shape, the power conversion ring being disposed closer to the rotation drive ring than the first end of the screw shaft along the longitudinal axis of the screw shaft; wherein:
- the first groove extend in a direction parallel to an axis direction of the power conversion ring; and
- the second groove extends in a direction non-parallel to the axis direction of the power conversion ring.

18. The tube expansion tool according to claim 17, further comprising:
- a linear movement member configured to be movably linked to the spindle, wherein:
- the linear movement member includes a protrusion extending in a direction perpendicular to an axis line of the linear movement member; and
- the protrusion extends so as to be inserted into one of the first and second grooves.

19. The tube expansion tool according to claim 14, further comprising:
- a screw shaft guide positioned within the main body housing, the screw shaft guide being configured to guide the screw shaft in a direction parallel to the longitudinal axis of the screw shaft, wherein:
- the screw shaft guide overlaps the grip in the direction parallel to the longitudinal axis of the screw shaft.

20. The tube expansion tool according to claim 12, wherein a portion of the electric motor protrudes away from the center axis of the grip in a direction parallel to the longitudinal axis of the screw shaft.

21. The tube expansion tool according to claim 12, wherein the electric motor with the output shaft, the screw shaft and the grip overlap in a direction parallel to the longitudinal axis of the screw shaft.

* * * * *